(12) United States Patent
Kasai

(10) Patent No.: US 8,786,731 B2
(45) Date of Patent: Jul. 22, 2014

(54) IMAGE PICKUP APPARATUS AND IMAGE PICKUP APPARATUS CONTROL METHOD THAT GENERATES AN IMAGE WITH TRANSFORMED NUMBER OF PIXELS

(75) Inventor: Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/634,970

(22) PCT Filed: Jan. 26, 2012

(86) PCT No.: PCT/JP2012/051599
§ 371 (c)(1),
(2), (4) Date: Sep. 14, 2012

(87) PCT Pub. No.: WO2012/114819
PCT Pub. Date: Aug. 30, 2012

(65) Prior Publication Data
US 2013/0010153 A1 Jan. 10, 2013

(30) Foreign Application Priority Data

Feb. 24, 2011 (JP) ................................ 2011-037943

(51) Int. Cl.
*H04N 5/235* (2006.01)
*H04N 5/335* (2011.01)
*H04N 5/347* (2011.01)
*H04N 5/345* (2011.01)

(52) U.S. Cl.
CPC ............. *H04N 5/347* (2013.01); *H04N 5/2355* (2013.01); *H04N 5/3458* (2013.01)
USPC ....................... 348/229.1; 348/308

(58) Field of Classification Search
CPC ... H04N 5/2355; H04N 5/343; H04N 5/3456; H04N 5/3458; H04N 5/347; H04N 5/35563; H04N 5/35581
USPC .................................... 348/229.1, 230.1, 308
See application file for complete search history.

(56) References Cited

U.S. PATENT DOCUMENTS

| | | | |
|---|---|---|---|
| 6,992,714 B1 * | 1/2006 | Hashimoto et al. | 348/273 |
| 7,612,812 B2 * | 11/2009 | Yamada | 348/275 |
| 7,948,543 B2 * | 5/2011 | Watanabe | 348/222.1 |
| 7,982,787 B2 * | 7/2011 | Nonaka et al. | 348/272 |
| 8,009,211 B2 * | 8/2011 | Hashimoto | 348/294 |

(Continued)

FOREIGN PATENT DOCUMENTS

| | | |
|---|---|---|
| EP | 2031880 A1 | 3/2009 |
| JP | 2003-023005 A | 1/2003 |

(Continued)

*Primary Examiner* — John Villecco
(74) *Attorney, Agent, or Firm* — Wolf, Greenfield & Sacks, P.C.

(57) ABSTRACT

Apparatus and method for realizing a processing with which a pixel gravity center control can be conducted when a pixel number reduction image is generated in an image pickup apparatus. A pixel unit configured to output a pixel addition signal obtained by adding output pixel signals from pixels having different sensitivities to each other and a pixel information synthesis unit configured to execute a weighted addition processing of multiplying plural pixel addition signals output from the pixel unit by a previously set gain and calculate a configuration pixel value of a pixel number reduction image where a total number of pixels is lower than a number of pixels of the pixel unit are provided.

9 Claims, 17 Drawing Sheets

(56) References Cited

U.S. PATENT DOCUMENTS

| | | | |
|---|---|---|---|
| 8,059,179 B2 * | 11/2011 | Nakano et al. | 348/272 |
| 8,077,232 B2 * | 12/2011 | Hashimoto | 348/272 |
| 8,107,775 B2 * | 1/2012 | Onomura | 382/300 |
| 8,120,663 B2 * | 2/2012 | Watanabe | 348/222.1 |
| 8,184,172 B2 * | 5/2012 | Nakaseko | 348/229.1 |
| 8,194,163 B2 * | 6/2012 | Mabuchi et al. | 348/294 |
| 8,305,458 B2 * | 11/2012 | Hara | 348/222.1 |
| 8,310,573 B2 * | 11/2012 | Hirota | 348/275 |
| 8,462,241 B2 * | 6/2013 | Hashimoto | 348/294 |
| 2002/0158980 A1 * | 10/2002 | Iizuka | 348/280 |
| 2004/0125223 A1 * | 7/2004 | Iizuka | 348/272 |
| 2004/0262493 A1 * | 12/2004 | Suzuki | 348/222.1 |
| 2006/0158537 A1 * | 7/2006 | Watanabe | 348/272 |
| 2008/0088725 A1 * | 4/2008 | Matsunaga | 348/302 |
| 2008/0170137 A1 * | 7/2008 | Matsumoto et al. | 348/241 |
| 2010/0245628 A1 * | 9/2010 | Hashimoto | 348/272 |
| 2011/0007193 A1 * | 1/2011 | Fujimura et al. | 348/294 |
| 2011/0234863 A1 * | 9/2011 | Ogasahara | 348/280 |
| 2012/0113290 A1 * | 5/2012 | Nakata et al. | 348/222.1 |
| 2012/0281111 A1 * | 11/2012 | Jo et al. | 348/229.1 |
| 2013/0016238 A1 * | 1/2013 | Ebihara et al. | 348/207.99 |
| 2013/0182165 A1 * | 7/2013 | Kimura | 348/311 |
| 2013/0242153 A1 * | 9/2013 | Hashimoto | 348/301 |

FOREIGN PATENT DOCUMENTS

| | | |
|---|---|---|
| JP | 2003-264844 A | 9/2003 |
| JP | 2004-147092 A | 5/2004 |
| JP | 2008-278453 A | 11/2008 |
| JP | 2010-178281 A | 8/2010 |
| WO | WO 2006/049098 A1 | 5/2006 |
| WO | 2009/055344 A2 | 4/2009 |

* cited by examiner

FIG. 1
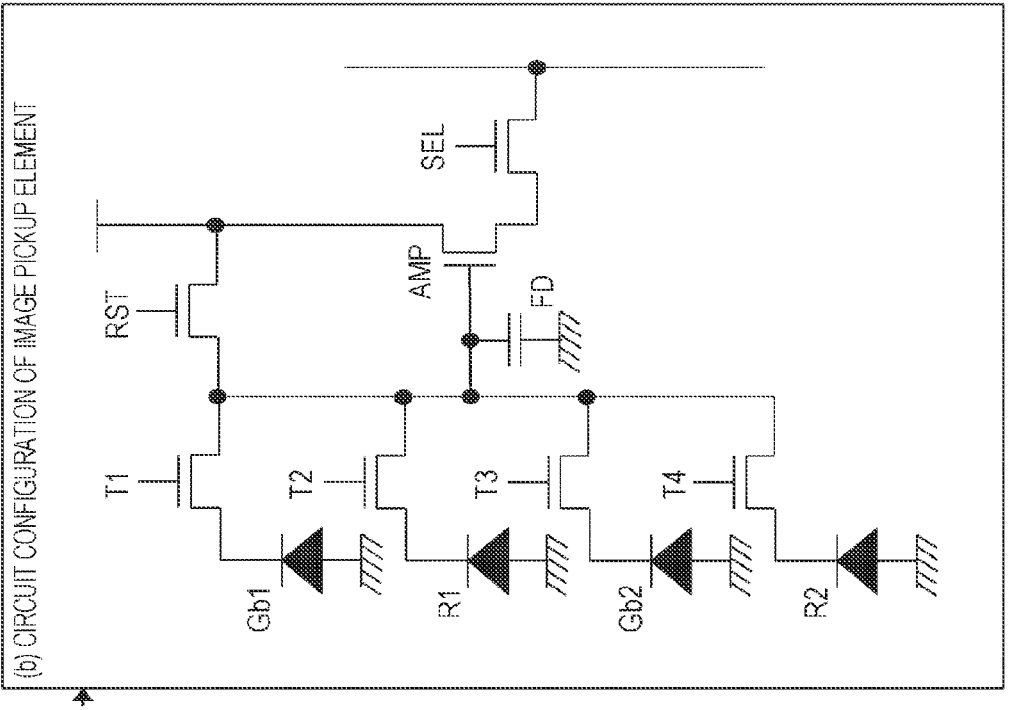
(b) CIRCUIT CONFIGURATION OF IMAGE PICKUP ELEMENT
PRIOR ART
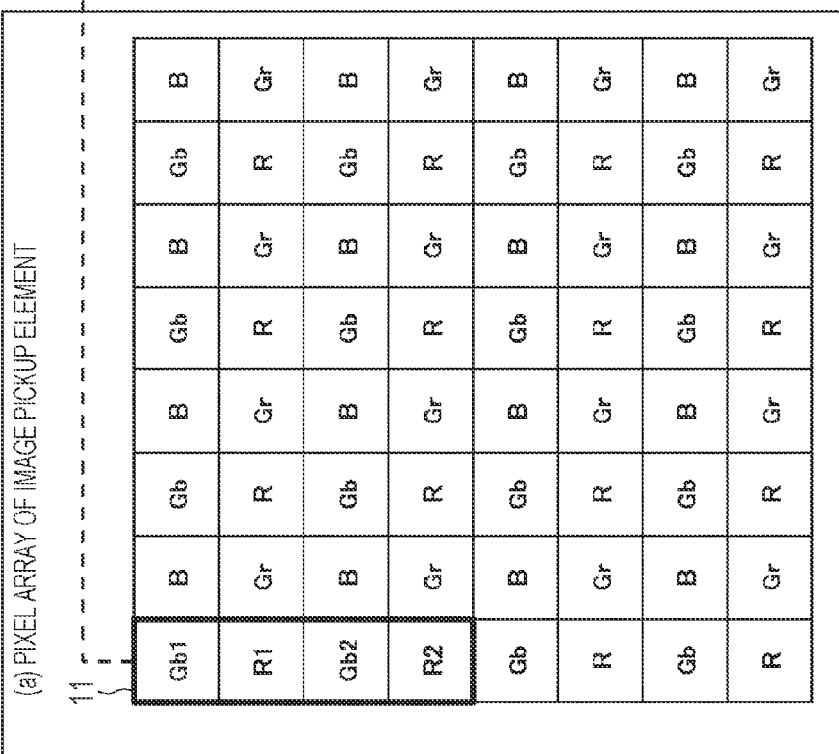
(a) PIXEL ARRAY OF IMAGE PICKUP ELEMENT
PRIOR ART FIG. 4
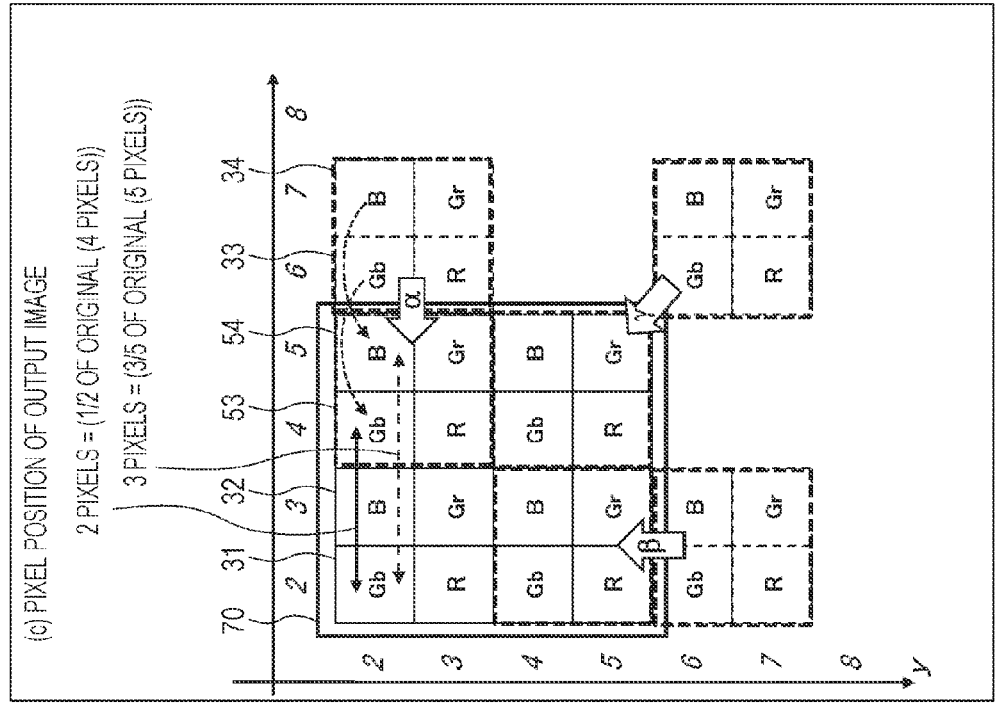
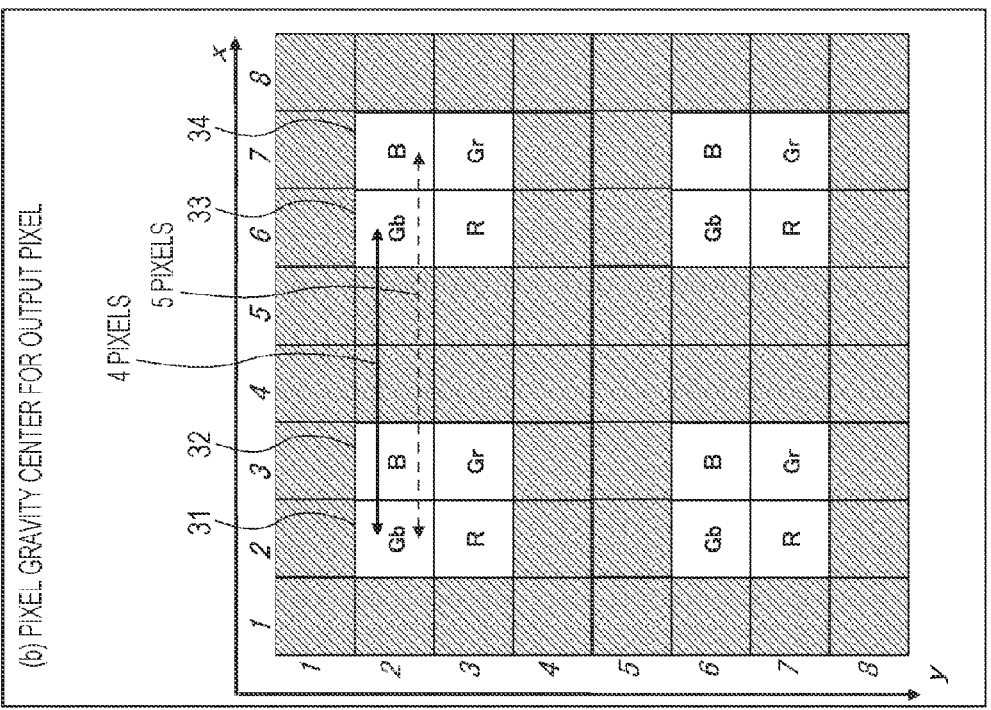

FIG. 9
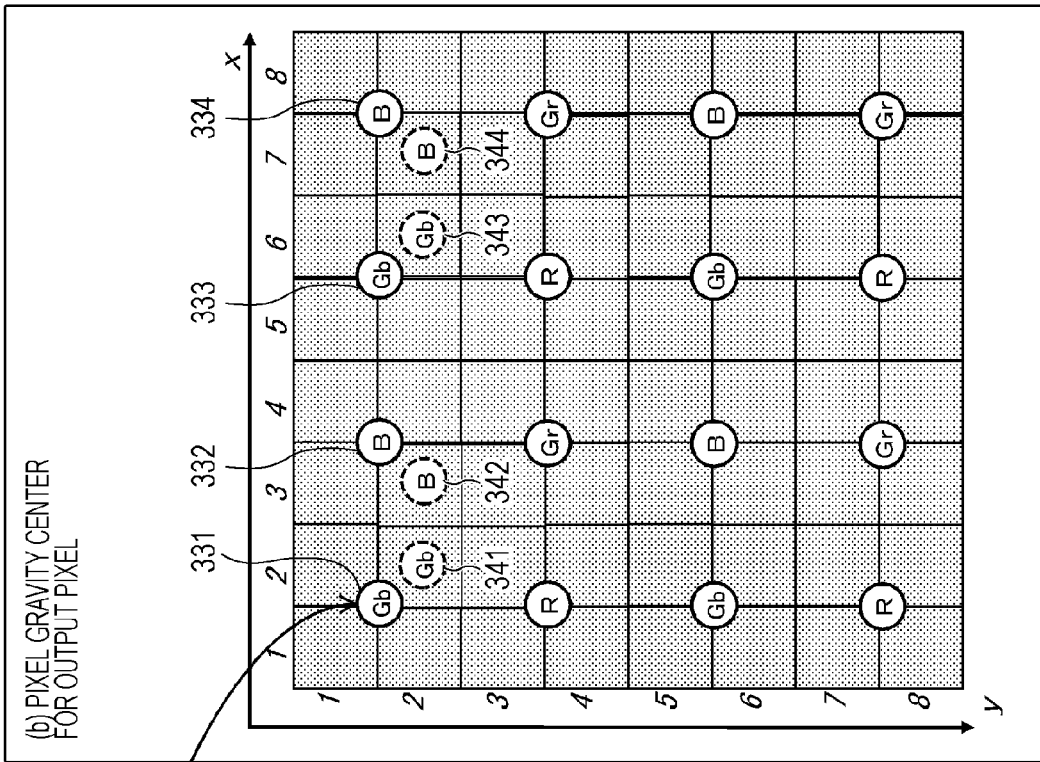
(b) PIXEL GRAVITY CENTER FOR OUTPUT PIXEL
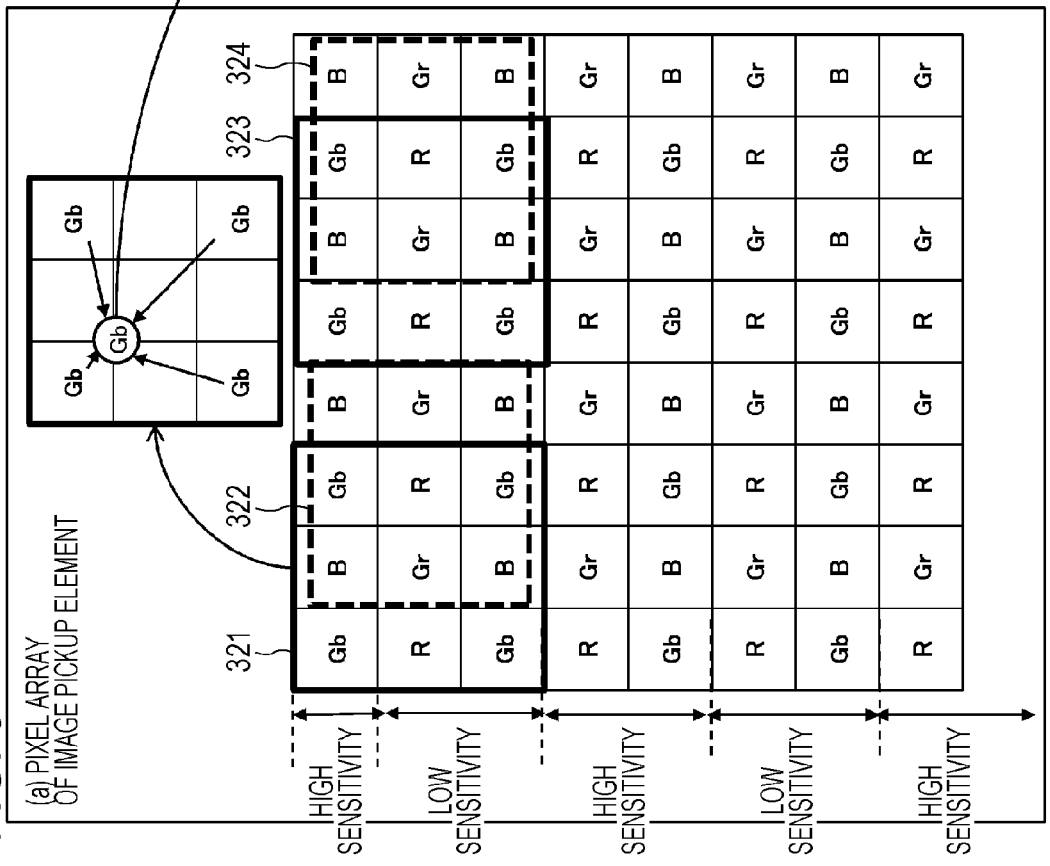
(a) PIXEL ARRAY OF IMAGE PICKUP ELEMENT FIG. 12
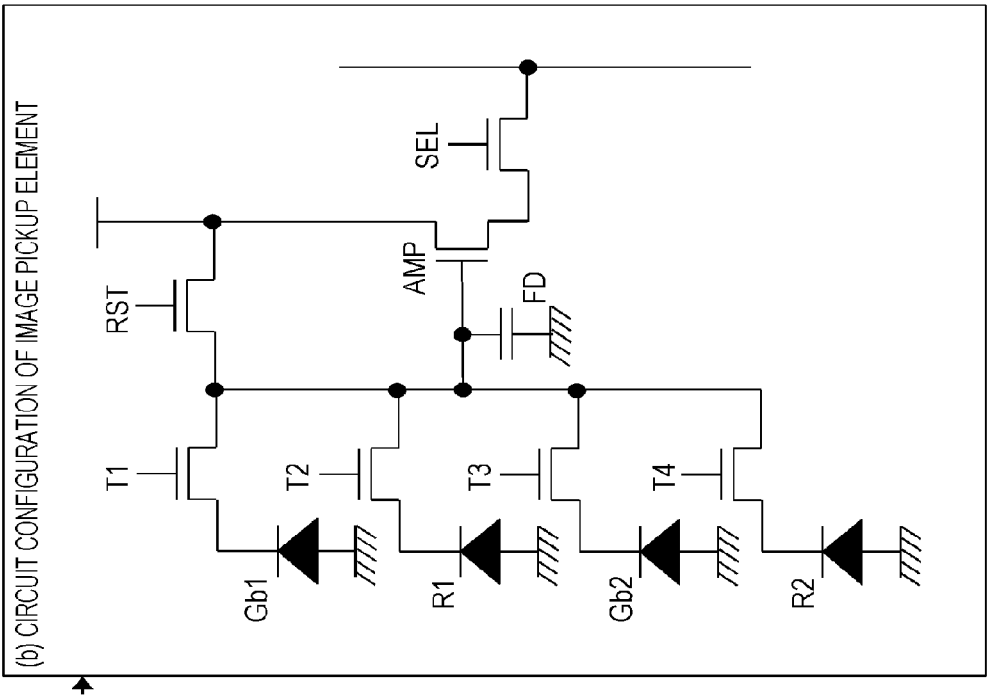
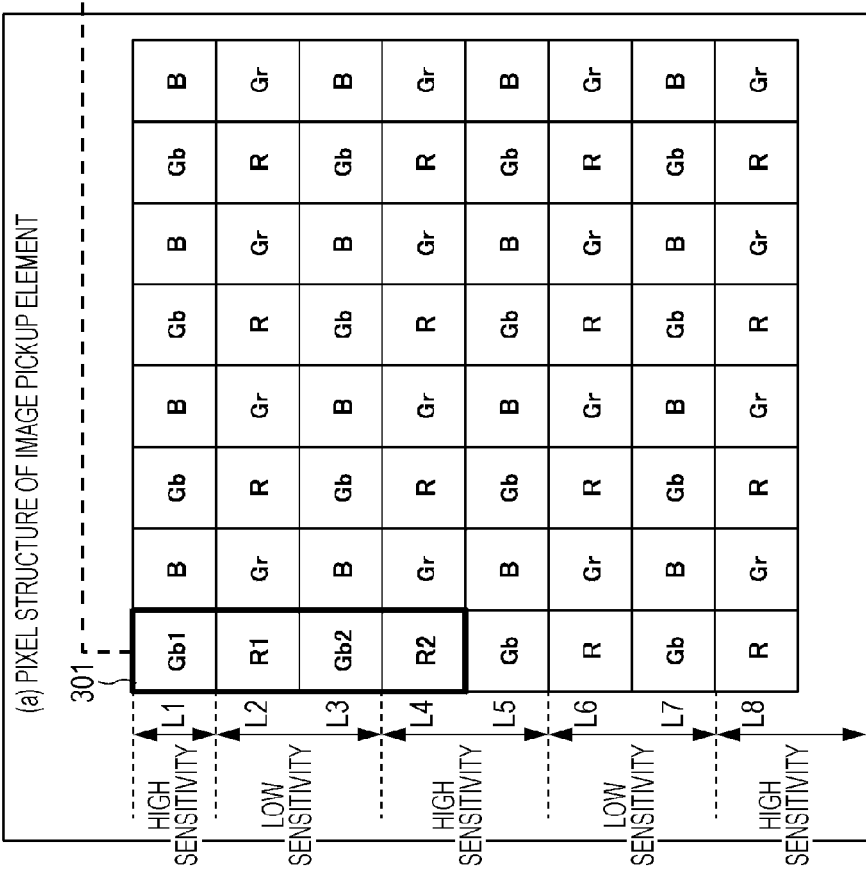

FIG. 16
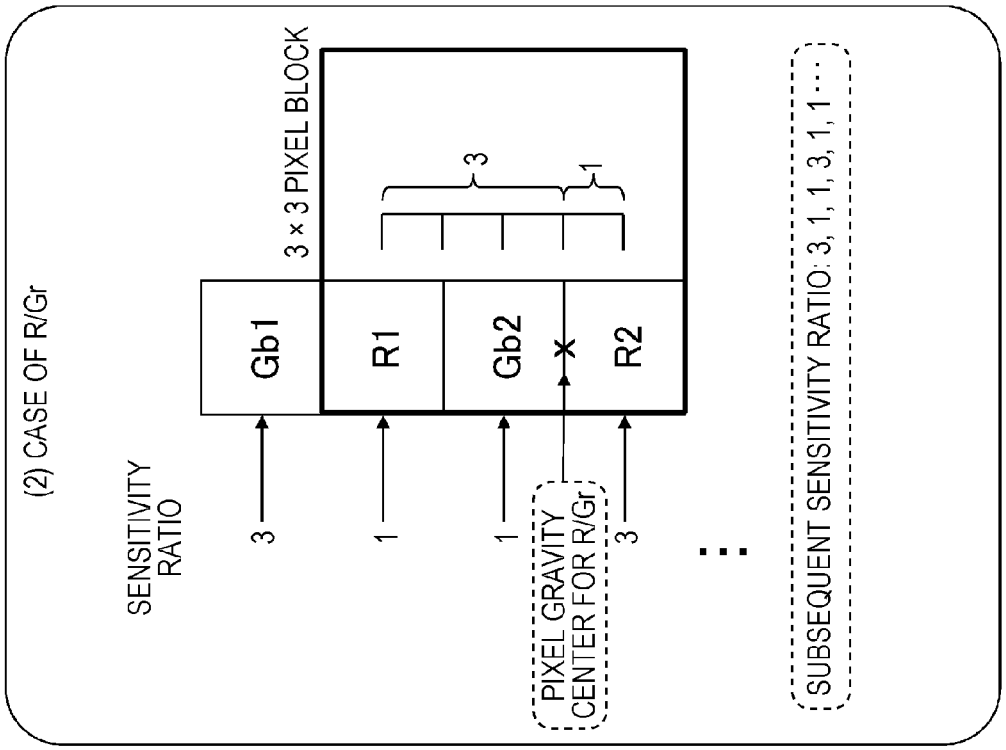
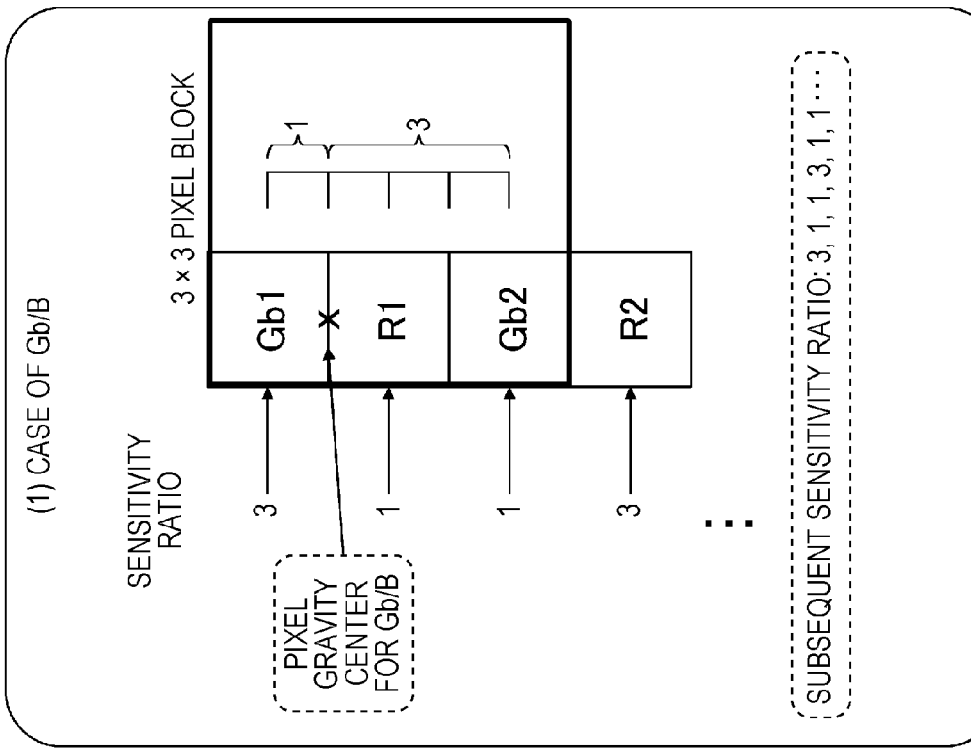

IMAGE PICKUP APPARATUS AND IMAGE PICKUP APPARATUS CONTROL METHOD THAT GENERATES AN IMAGE WITH TRANSFORMED NUMBER OF PIXELS

TECHNICAL FIELD

The present invention relates to an image pickup apparatus and an image pickup apparatus control method, and a program. In further detail, the invention relates to an image pickup apparatus that generates an image signal in which the number of pixels is transformed through a processing on an output signal of an image pickup element and an image pickup apparatus control method, and a program.

BACKGROUND ART

Many of image pickup apparatuses in these days are being provided with an image pickup element having an extremely large number of pixels from several million to several tens of million pixels for picking up a high resolution image.

However, it is uncommon to utilize a display apparatus that can output a high resolution image corresponding to the number of pixels provided to the image pickup element, and a situation also occurs in which if the high resolution image output from the image pickup element is recorded in a memory as it is, a memory capacity necessary for the recording is increased, and the number of images that can be recorded is decreased.

By taking the above-mentioned circumstances into account, in the image pickup apparatus provided with the image pickup element having the large number of pixels, an output pixel signal from the image pickup element is not recorded in the memory as it is, and a processing of reducing the total number of pixels to be recorded in the memory is often carried out through a processing of thinning out the number of output pixels or a synthesis processing including an addition computation of plural pixels and the like.

A related art technology disclosing the above-mentioned pixel number reduction processing includes, for example, PTL 1 (Japanese Unexamined Patent Application Publication No. 2008-278453).

With reference to FIG. 1, an outline of the processing described in PTL 1 will be described.

FIG. 1 illustrates
(a) a pixel arrangement of an image pickup element, and
(b) a circuit configuration of the image pickup element which are described in the above-mentioned PTL 1.

It should be noted that the circuit illustrated in FIG. 1(b) is a circuit corresponding to a pixel region 11 for a part of four pixels including Gb1, R1, Gb2, and R2 illustrated in FIG. 1(a).

According to one of embodiments described in PTL 1, in the image pickup element configuration illustrated in FIG. 1(a), the pixel region 11 is set as a common pixel region, that is, a unit region including plural pixels for deciding a pixel value of one pixel constituting an output image as the pixel number reduction image. The pixels of Gb and R are connected via transfer transistors (T1 to T4) to a gate part of a transistor for amplification (AMP) as illustrated in FIG. 1(b).

To obtain the output image where the number of pixels is reduced, by using the circuit configuration illustrated in FIG. 1(b), an addition computation of pixels having a same color included in the region 11 (according to the present example, Gb1 and Gb2) is carried out.

FIG. 2 illustrates a timing chart of a pixel value addition processing executed by using the circuit configuration illustrated in FIG. 1(b).

FIG. 2 illustrates these signal patterns of
transfer transistor signals: T1 to T4,
a reset signal: RST (reset of floating diffusion (FD)), and
a selection signal: SEL, in
(1) a shutter operation for regulating an exposure start, and
(2) a read out operation for regulating an exposure end.

FIG. 2 illustrates a signal pattern in a case where an addition processing for the pixel Gb1 and the pixel Gb2 illustrated in FIG. 1(a) is carried out.

A period between times ts and te illustrated in FIG. 2 is equivalent to an exposure period.

In response to ON of the transistors T1 and T3 in the shutter operation of (1) in FIG. 2, an exposure for the pixel Gb1 and the pixel Gb2 illustrated in FIG. 1(a) is started. After that, in response to ON of the transistors T1 and T3 in the read out operation of (2) in FIG. 2, the exposure for the pixel Gb1 and the pixel Gb2 illustrated in FIG. 1(a) is ended, and the read out processing is executed.

In an initial stage (T=t1) of the read out processing, the selection (SEL) of the common pixel and the reset (RST) of the floating diffusion (FD) are carried out, and subsequently, at a time (T=t2), the transistors T1 and T3 of the pixel Gb1 and the pixel Gb2 illustrated in FIG. 1(a) are read out at the same time, and electrons generated in Gb1 and Gb2 are accumulated in the floating diffusion (FD) for the addition. Thus, an addition signal based on pixel values of the two pixels is obtained. An average signal of the plural pixels is calculated on the basis of these addition signals, for example, and an output pixel value is calculated.

According to PTL 1, while the above-mentioned addition processing for the plural pixel is used as a basic configuration, for example, a pixel number reduction configuration through a pixel value addition while four pixels are set as one pixel as illustrated in FIG. 3 is disclosed. FIG. 3 illustrates these drawings of
(a) a pixel array of the image pickup element, and
(b) a pixel gravity center of the output pixel.

The pixel array illustrated in FIG. 3(a) is a pixel array similar to the pixel array illustrated in FIG. 1(a). This pixel array is equivalent to a pixel array of the image pickup element.

On the basis of four pixels corresponding to pixels having the same color in the image pickup element of FIG. 3(a), a pixel value of one pixel of the output image is set and output.

That is, the total number of pixels is reduced by consolidating the four pixels into one pixel for the output.

The pixel gravity center of output pixel of FIG. 3(b) illustrates a pixel gravity center in the original image pickup element with regard to each of the output pixels after the reduction in the number of pixels.

For example, a Gb pixel 31 of FIG. 3(b) corresponds to a pixel value decided by evenly using pixel values of Gb pixels on four corners in a 3×3 pixel block 21 of FIG. 3(a), and a pixel gravity center is set at a center position of the 3×3 pixel block 21. This gravity center position is represented by the Gb pixel 31 of FIG. 3(b)

An example illustrated in FIG. 3 is an example in which a processing of reducing the number of pixels of the output image into ¼ of the number of pixels of the image pickup element is carried out while 64 pixels of 8×8 pixels illustrated in (a) is set as 4×4=16 pixels illustrated in (b).

For this processing, for example, the addition processing on the (Gb) pixels on the four corners of the 3×3 pixel block 21 illustrated in FIG. 3(a) is executed, and the pixel value of one Gb pixel in the output image is calculated.

The pixel values of the two Gb in a vertical direction are added while following the circuit described above with reference to FIG. 1(b). After that, two addition values output from the image pickup element in every other column are further added to calculate an addition value of the four Gb pixel values, and thereafter, an average value or the like based on these addition values is calculated to decide the pixel value of one pixel of the output image based on the four pixel.

That is, on the basis of the four Gb pixels included in the 3×3 pixel block 21 illustrated in FIG. 3(a), the pixel value of the Gb pixel 31 illustrated in FIG. 3(b) is calculated.

In this case, the gravity center of the Gb pixel 31 in the output image is at a position of (x, y)=(2, 2) in coordinate axes where a horizontal right direction is set as x and a vertical downward direction is set as y, that is, a position of the Gb pixel 31 illustrated in FIG. 3(b).

Also, on the basis of the four B pixels included in a 3×3 pixel block 22 illustrated in FIG. 3(a), a pixel value of a B pixel 32 illustrated in FIG. 3(b) is calculated.

In this case, a gravity center of the B pixel 32 in the output image is at a position of (x, y)=(3, 2), that is, a position of the B pixel 32 illustrated in FIG. 3(b).

Similarly, on the basis of the four Gb pixels included in a 3×3 pixel block 23 illustrated in FIG. 3(a), a pixel value of a GB pixel 33 illustrated in FIG. 3(b) is calculated.

In this case, a gravity center of the Gb pixel 33 in the output image is at a position of (x, y)=(6, 2), that is, a position of the B pixel 33 illustrated in FIG. 3(b).

Also, on the basis of the four B pixels included in a 3×3 pixel block 24 illustrated in FIG. 3(a), a pixel value of a B pixel 34 illustrated in FIG. 3(b) is calculated.

In this case, a gravity center of the B pixel 34 in the output image is at a position of (x, y)=(7, 2), that is, a position of the B pixel 34 illustrated in FIG. 3(b).

The total 16 pixels illustrated in FIG. 3(b) are output as an image of 4×4 pixels in a case where the pixels are set as an output image.

That is, the pixels are output as an image 70 of 4×4 pixels as illustrated in FIG. 4(c).

FIG. 4 illustrates these (b) a pixel gravity center of the output pixel (same as FIG. 3(b)), and (c) a pixel position of the output image.

In FIG. 4(c), a consideration is given while 2×2 pixels on the upper left, that is, a block of 2×2 pixels including the Gb pixel 31 and the B pixel 32 is fixed. In the case of this setting, the other three 2×2 pixel blocks are all moved in accordance with arrows (α), (β), and (γ) illustrated in FIG. 4(c) and output as constitutional pixels of the image 70 of 4×4 pixel illustrated in FIG. 4(c).

Through this shift processing, the following problem occurs.

For example, the Gb pixel 33 where the position of the pixel gravity center is at (x, y)=(6, 2) is set as a Gb pixel 53 where the pixel position is at (x, y)=(3, 2) in the output image.

Also, the B pixel 34 where the position of the pixel gravity center is at (x, y)=(7, 2) is set as a B pixel 54 where the pixel position is at (x, y)=(3, 3) in the output image.

Here, a reduction scale rate is calculated.

A consideration is given while it is assumed that the GB pixel 31 at the pixel position (x, y)=(2, 2) is set as a reference pixel at a fixed position.

The Gb pixel 33 at the pixel position (x, y)=(6, 2) illustrated in FIG. 4(b) is away by 4 pixels from the Gb pixel 31 corresponding to the reference pixel.

In the output image, since this is set as the Gb pixel 53 where the pixel position is (x, y)=(3, 2), a distance from the reference pixel: the Gb pixel 31 is 2 pixels.

That is, the reduction scale rate is 2 pixels/4 pixels=½.

On the other hand, the B pixel 34 at the pixel position (x, y)=(7, 2) illustrated in FIG. 4(b) is away by 5 pixels from the Gb pixel 31 corresponding to the reference pixel.

In the output image, since this is set as the B pixel 54 where the pixel position is (x, y)=(4, 2), a distance from the reference pixel: the Gb pixel 31 is 3 pixels.

That is, the reduction scale rate is 3 pixels/5 pixels=⅗.

In this manner, the reduction scale rates between the pixels fluctuate, and an output image having a relative position different from relative positions of the respective pixels of the picked-up image corresponding to the pixel array of the image pickup element is generated.

That is, the output image is generated while spacings between the respective pixels of an original image picked up in the image pickup element are unevenly reduced.

The above-mentioned unevenness in the pixel spacings causes an image quality degradation.

To be specific, for example, a degradation such as an expansion of jaggies illustrated in FIG. 5 occurs.

The original image of FIG. 5(A) is a high resolution image with a large number of pixels equivalent to the picked-up image of the image pickup element, and this image has small jaggies.

If the pixel number reduction processing with which the relative pixel positions described with reference to FIG. 1 to FIG. 4 are set to be varied is carried out on the basis of this original image of FIG. 5(A), an image in which the jaggies are expanded as illustrated in FIG. 5 (B) is generated.

It should be noted that the jaggies are a type of folding noise. Because of the unevenness in the spacings between the pixel gravity centers after the addition, the jaggy degradation is increased.

It should be noted that in addition to this, a disarray of positional relationships between respective color arrangements of RGB or the like causes various image quality degradations in which a difference also occurs in colors between the output image and the original image.

CITATION LIST

Patent Literature

PTL 1: Japanese Unexamined Patent Application Publication No. 2008-278453

SUMMARY OF INVENTION

Technical Problem

The present invention has been made, for example, in view of the above-mentioned circumstances, and it is an object to provide an image pickup apparatus and an image pickup apparatus control method, and a program with which it is possible to generate a high quality image in which an image quality degradation is suppressed when an image having a different number of pixels from the number of pixels provided to an image pickup element is generated and output.

Solution to Problem

A first aspect of the present invention resides in an image pickup apparatus including:

a pixel unit configured to output a pixel addition signal obtained by adding output pixel signals from pixels having different sensitivities to each other; and a pixel information synthesis unit configured to execute a weighted addition processing of multiplying plural pixel addition signals output from the pixel unit by a previously set gain and calculate a configuration pixel value of a pixel number reduction image where a total number of pixels is lower than a number of pixels of the pixel unit, in which a control on gravity center positions for respective pixels constituting the pixel number reduction image is executed through the pixel addition signal generation processing by the pixel unit and the weighted addition processing by the pixel information synthesis unit.

Furthermore, according to an embodiment of the image pickup apparatus of the present invention, the pixel unit and the pixel information synthesis unit execute a gravity center position control to evenly arrange the gravity center positions for the respective pixels constituting the pixel number reduction image in the pixel unit.

Furthermore, according to an embodiment of the image pickup apparatus of the present invention, the pixel unit executes a gravity center position control in one direction of the respective pixels constituting the pixel number reduction image in the pixel addition signal generation processing, and the pixel information synthesis unit executes, in the weighted addition processing, the gravity center position control in a direction orthogonal to the gravity center position control direction executed by the pixel unit.

Furthermore, according to an embodiment of the image pickup apparatus of the present invention, the pixel unit performs a calculation for an addition pixel value as a result of the gravity center position control in accordance with a sensitivity ratio of pixels corresponding to addition processing targets in the pixel addition signal generation processing.

Furthermore, according to an embodiment of the image pickup apparatus of the present invention, the pixel information synthesis unit executes a weighted addition processing of multiplying plural pixel addition signals corresponding to weighted addition processing targets by a gain in accordance with a gravity center position of a planned control in the weighted addition processing.

Furthermore, according to an embodiment of the image pickup apparatus of the present invention, the pixel unit has a pixel array in which pixels of a same color are arranged in every other row and pixels set to have a different sensitivity of a sensitivity ratio 1:3 are arranged every two other rows, and the pixel unit has a configuration of outputting a pixel addition signal obtained by adding output pixel signals from pixels having two different sensitivities where the sensitivity ratio is 1:3 to each other.

Furthermore, according to an embodiment of the image pickup apparatus of the present invention, the pixel unit has a pixel array in which pixels of a same color are arranged in every other column, and the pixel information synthesis unit executes a weighted addition processing of multiplying two pixel addition signals output from the pixel unit in every other column by a gain of 1:3 and calculates the configuration pixel value of the pixel number reduction image where the total number of pixels is lower than the number of pixels of the pixel unit.

Furthermore, according to an embodiment of the image pickup apparatus of the present invention, the image pickup apparatus further includes a control unit configured to execute an exposure time control for units of a region of the pixel unit.

Furthermore, a second aspect of the present invention resides in an image pickup apparatus control method executed in an image pickup apparatus, the control method including:

a pixel addition signal output step of outputting, in a pixel unit, a pixel addition signal obtained by adding output pixel signals from pixels having different sensitivities to each other; and a pixel information synthesis step of executing, in a pixel information synthesis unit, a weighted addition processing of multiplying plural pixel addition signals output from the pixel unit by a previously set gain and calculating a configuration pixel value of a pixel number reduction image where a total number of pixels is lower than a number of pixels of the pixel unit, in which a control on gravity center positions for respective pixels constituting the pixel number reduction image is executed through the pixel addition signal generation processing by the pixel unit and the weighted addition processing by the pixel information synthesis unit.

Furthermore, a third aspect of the present invention resides in a program for executing an image pickup apparatus control processing in an image pickup apparatus, the program including:

causing a pixel unit to execute a pixel addition signal output step of outputting a pixel addition signal obtained by adding output pixel signals from pixels having different sensitivities to each other; and causing a pixel information synthesis unit to execute a pixel information synthesis step of executing a weighted addition processing of multiplying plural pixel addition signals output from the pixel unit by a previously set gain and calculating a configuration pixel value of a pixel number reduction image where a total number of pixels is lower than a number of pixels of the pixel unit, in which a control on gravity center positions for respective pixels constituting the pixel number reduction image is executed through the pixel addition signal generation processing by the pixel unit and the weighted addition processing by the pixel information synthesis unit.

It should be noted that the program according to the present invention is, for example, a program provided to an information processing apparatus or a computer system that can execute various program codes by way of, for example, a recording medium. A processing in accordance with the program is realized while a program execution unit on the information processing apparatus or the computer system executes the above-mentioned program.

Further objects, features, and advantages of the present invention will become apparent from the following detailed description based on embodiments of the present invention and the attached drawings. It should be noted that the system in the present specification is a logical aggregate structure of plural apparatuses and is not limited to a system in which apparatuses of the respective structures are located in a same casing.

Advantageous Effects of Invention

According to the embodiment of the present invention, the apparatus and method for realizing the processing with which the control on the pixel gravity center can be conducted when the pixel number reduction image is generated in the image pickup apparatus.

To be specific, a pixel unit configured to output a pixel addition signal obtained by adding output pixel signals from pixels having different sensitivities to each other and a pixel information synthesis unit configured to execute a weighted addition processing of multiplying plural pixel addition signals output from the pixel unit by a previously set gain and calculate a configuration pixel value of a pixel number reduction image where a total number of pixels is lower than a number of pixels of the pixel unit are provided. A control on gravity center positions for respective pixels constituting the pixel number reduction image is executed through the pixel addition signal generation processing by the pixel unit and the weighted addition processing by the pixel information synthesis unit. For example, a gravity center position control to evenly arrange the gravity center positions for the respective pixels constituting the pixel number reduction image in the pixel unit is executed.

Through this processing, it is possible to generate a high quality image in which a generation of jaggies or the like is suppressed.

BRIEF DESCRIPTION OF DRAWINGS

FIG. 1 is an explanatory diagram for describing a pixel value addition processing in an image pickup element as a related art technology.

FIG. 4 is an explanatory diagram for describing a problematic point in a related art processing.

FIG. 9 is an explanatory diagram for describing the pixel number reduction image and a control on a pixel gravity center.

FIG. 12 is an explanatory diagram for describing a detailed configuration of the image pickup element and a processing.

FIG. 16 is an explanatory diagram for describing the gravity center position control in the vertical direction based on the pixel value addition corresponding to the processing by the image pickup element.

DESCRIPTION OF EMBODIMENTS

Hereinafter, details of an image pickup apparatus and an image pickup apparatus control method, and a program according to the present invention will be described with reference to the drawings. The description will be conducted in accordance with the following items.

1. Regarding configuration example of image pickup apparatus
2. Regarding configuration example of image pickup element
3. Regarding specific example of generation processing for pixel number reduction image
4. Regarding specific configuration and specific processing example of image pickup element

[1. Regarding Configuration Example of Image Pickup Apparatus]

First, an entire configuration example of an image pickup apparatus will be described with reference to FIG. 6.

Figure 6:
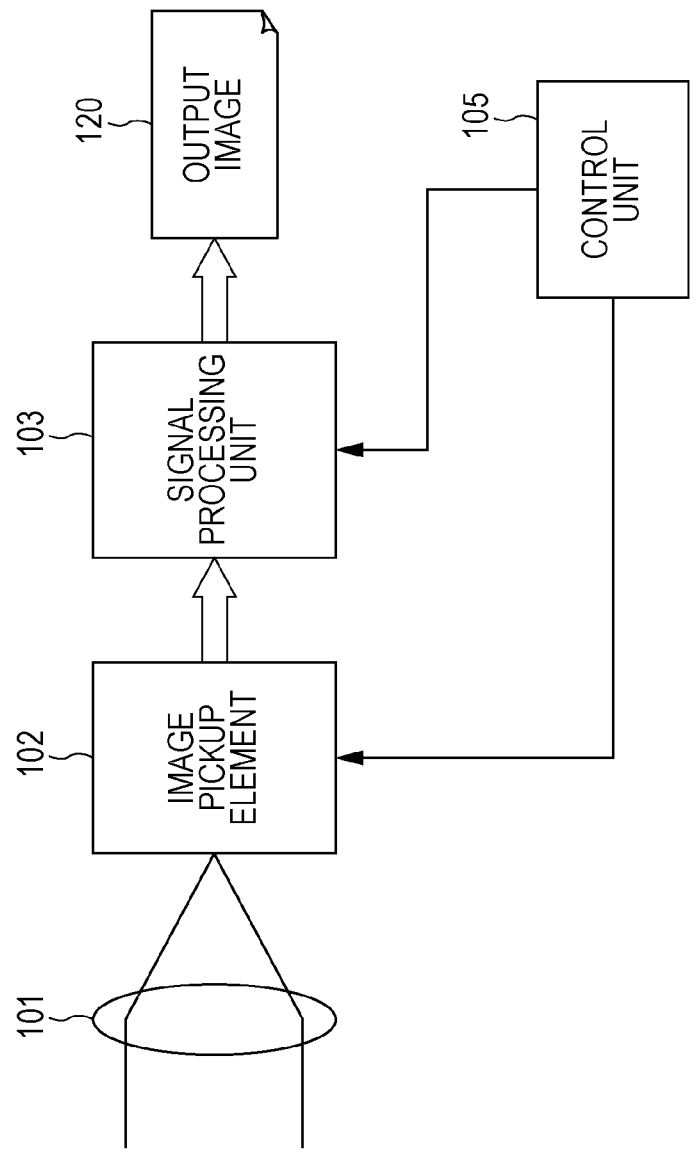
FIG. 6 is an explanatory diagram for describing a configuration example of an image pickup apparatus.

FIG. 6 is a block diagram illustrating a configuration example of the image pickup apparatus. Incident light via an optical lens 101 enters an image pickup element 102 composed, for example, of a CMOS image sensor or the like, and image data based on a photoelectric conversion is output. The output image data is input to a signal processing unit 103. The signal processing unit 103 generates an output image 120 by executing, for example, a signal processing in a general camera such as a white balance (WB) adjustment or a gamma correction. The output image 120 is stored in a storage unit that is not illustrated in the drawing or output to a display unit.

A control unit 105 outputs a control signal to the respective units in accordance with, for example, a program stored in a memory that is not illustrated in the drawing and performs a control on various processings.

[2. Regarding Configuration Example of Image Pickup Element]

Next, a configuration example of the image pickup element 102 will be described with reference to FIG. 7.

Figure 7:
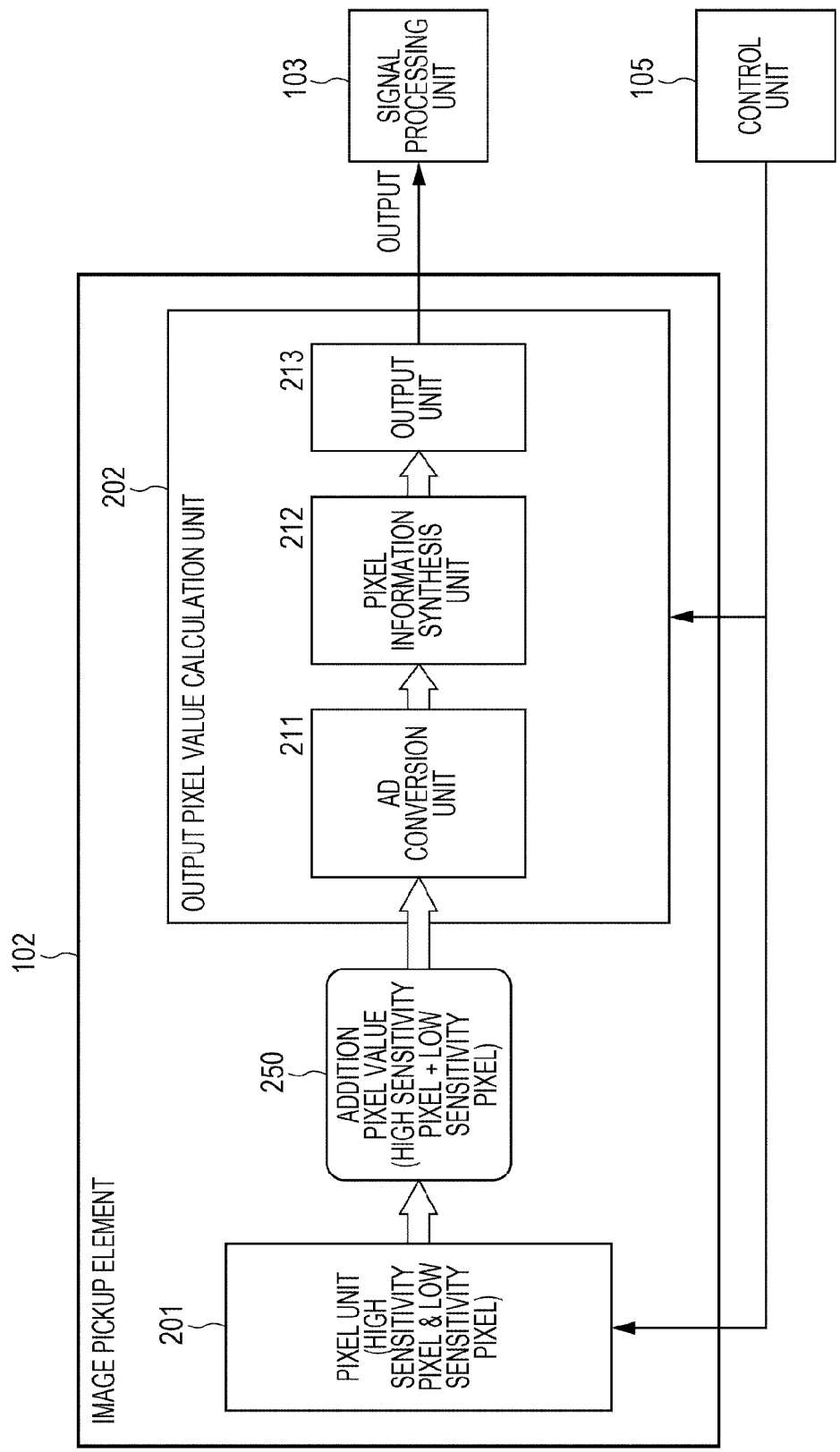
FIG. 7 is an explanatory diagram for describing a configuration of the image pickup element and a processing example.

FIG. 7 illustrates a configuration of the image pickup element 102 according to an embodiment of the present invention.

The image pickup element 102 has a pixel unit 201 and an output pixel value calculation unit 202 as illustrated in FIG. 7.

The output pixel value calculation unit 202 has an AD conversion unit 211, a pixel information synthesis unit 212, and an output unit 213.

The pixel unit 201 accumulates charges based on subject light in each of a large number of pixels and outputs image data of a high number of pixels corresponding to a high resolution image.

It should be noted that the pixel unit 201 is configured to have a high sensitivity pixel where a long time exposure is carried out and a low sensitivity pixel where a short time exposure is carried out. A detailed configuration the pixel unit 201 will be described below.

The pixel unit has a pixel configuration composed of an array of RGbGrB, for example, similar to that described with reference to FIG. 1 above and is provided with an output circuit similar to FIG. 1(b), an addition pixel value 250 obtained by two pixel values of a same color is output from the pixel unit 201.

It should be noted however that according to the present embodiment, the addition pixel value 250 output from the pixel unit 201 is an addition value of the two pixel values of the same color, but an addition value of two pixel values at these two different sensitivity is output as the addition pixel value 250:

(a) the pixel value of the high sensitivity pixel where the long time exposure is carried out, and (b) the pixel value of the low sensitivity pixel where the short time exposure is carried out.

A configuration of this processing will be described in a subsequent stage.

The addition pixel value 250 output from the pixel unit 201 is converted into digital data in the AD conversion unit 211 of the output pixel value calculation unit 202 and input to the pixel information synthesis unit 212.

In the pixel information synthesis unit 212, by utilizing digital data on the addition pixel value input from the AD conversion unit 211, a calculation on pixel values of the respective pixels constituting the output image where the number of pixels in the pixel unit 201 is reduced.

For example, pixel values of respective pixels of a pixel number reduction image where the number of pixels in the pixel unit 201 is reduced to ¼ are decided. A specific processing example will be described below.

The output unit 213 outputs image data where the number of pixels is reduced which is input from the pixel information synthesis unit 212 to the signal processing unit 103.

It should be noted that the control unit 105 supplies, for example, a control signal for an exposure time of the pixel unit 201, a processing control signal for the output pixel value calculation unit 202, and the like in accordance with the program stored in the memory that is not illustrated in the drawing.

[3. Regarding Specific Example of Generation Processing for Pixel Number Reduction Image]

Next, a specific example of a generation processing for a pixel number reduction image which is executed by the image pickup apparatus according to the present embodiment will be described.

First, with reference to FIG. 8, a specific configuration example of the pixel unit 201 and an example of the pixel number reduction processing executed by the output pixel value calculation unit 202 will be described.

Figure 8:
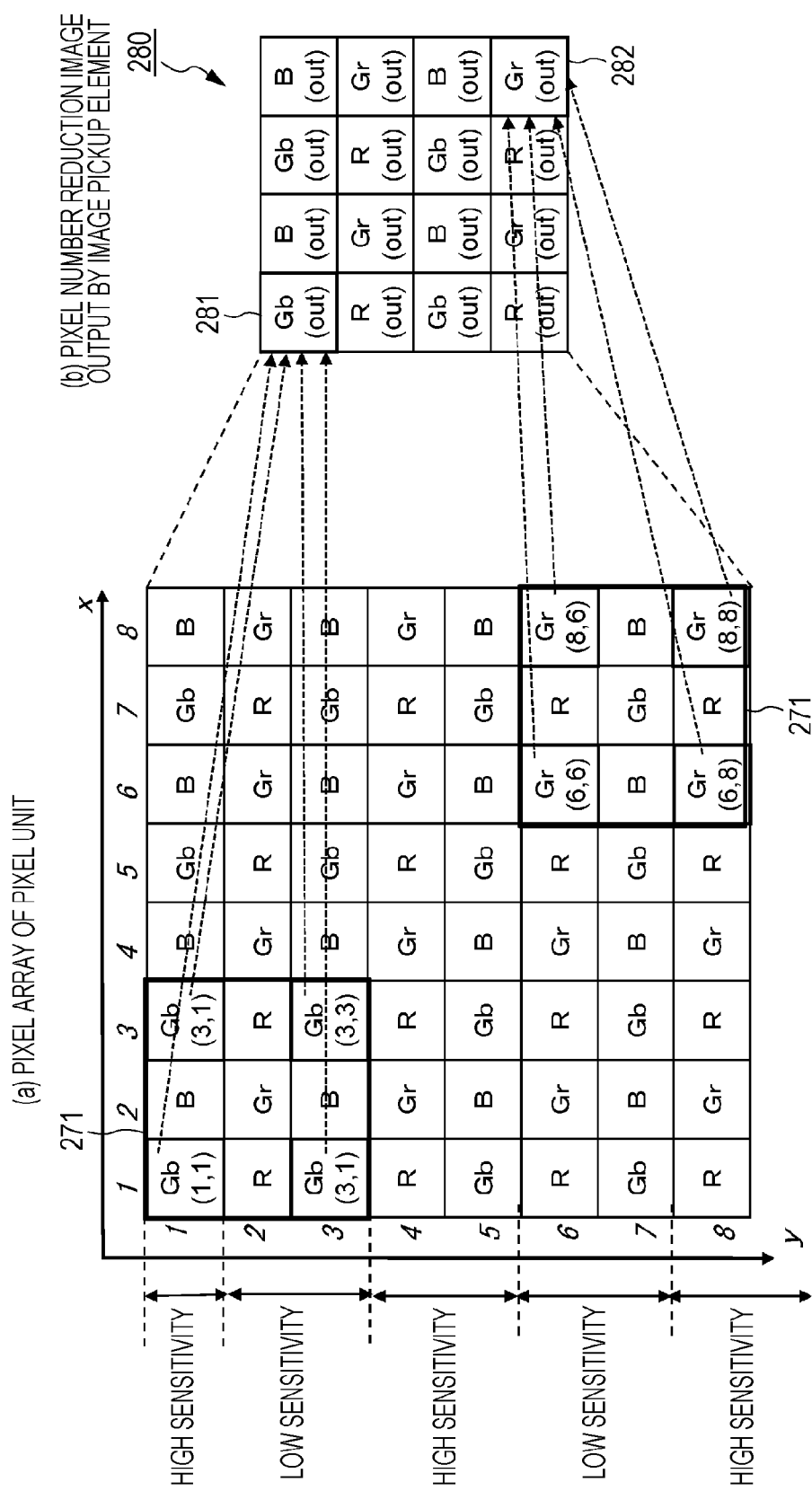
FIG. 8 is an explanatory diagram for describing a generation example of a pixel number reduction image.

FIG. 8 illustrates the following drawings.

(a) Pixel array example of the pixel unit 201

(b) Pixel number reduction image output by the image pickup element 102

In the drawing, to easily recognize pixel positions of the respective pixels constituting the pixel unit, while the horizontal axis is set as x and the vertical axis is set as y, the respective pixel positions are represented by coordinates (x, y).

While the position of the Gb pixel on the upper left edge is set as (x, y)=(1, 1), and the position of the Gr pixel on the lower right edge is set as (x, y)=(8, 8), 8×8 pixels are illustrated. It should be noted that the 8×8 pixels illustrated in FIG. 8(a) is a drawing only illustrating a part of the pixel unit 201 (a part of the upper left edge part of the pixel unit 201).

The pixel array of the pixel unit 201 illustrated in FIG. 8(a) has a pixel array of Bayer pattern (RGbGrB) similarly as in the pixel described above with reference to FIG. 1.

The pixel unit 201 has a configuration of including the high sensitivity pixel where the long time exposure is carried out and the low sensitivity pixel where the short time exposure is carried out.

As illustrated in the drawing, a configuration is adopted from an upper row in which, the first row is a high sensitivity pixel row where the long time exposure is carried out, the second and third rows are low sensitivity pixel rows where the short time exposure is carried out, the fourth and fifth rows are high sensitivity pixel rows where the long time exposure is carried out, and the sixth and seventh rows are low sensitivity pixel rows where the short time exposure is carried out, and hereinafter, the high sensitivity pixels and the low sensitivity pixels are set in units of two rows.

It should be noted that these exposure time controls are executed, for example, on the basis of the control signal of the control unit 105.

FIG. 8(b) illustrates a pixel number reduction image 280 output by the image pickup element 201.

For example, on the basis of pixel values of Gb pixels on four corners included in a 3×3 pixel block 271 illustrated on the upper left edge in (1) of FIG. 8, the image pickup element 102 decides and outputs a pixel value of one Gb pixel 281 on the upper left edge constituting the pixel number reduction image 280.

Similarly, for example, on the basis of pixel values of Gr pixels on four corners included in a 3×3 pixel block 272 illustrated on the lower right edge in (1) of FIG. 8, a pixel value of one Gr pixel 282 on the lower right edge constituting the pixel number reduction image 280 is decided and output.

With regard to all the other respective pixels of RGbGrB, on the basis of pixel values of the same color on four corners of the 3×3 pixel blocks set at various positions, the image pickup element 102 decides and outputs the respective pixel values of RGbGrB constituting the pixel number reduction image 280.

In this manner, the pixel values of the respective pixels of the pixel number reduction image 280 where the number of pixels in the pixel unit 201 is reduced to ¼ are decided and output.

Next, with reference to FIG. 9, a setting example of a block (3×3 pixel block) and a pixel gravity center of an output pixel (pixel set in the pixel number reduction image 280).

In the processing based on the addition processing of the plural pixels of the image pickup element according to the related art technology described above with reference to FIG. 1 to FIG. 4, the problem occurs that the gravity center position in the output image is shifted from the original picked-up image.

In contrast to this, with the image pickup apparatus according to the present embodiment, a gravity center position control in the vertical direction (y direction) is carried out by combining pixels with different exposure times, that is, pixels having different sensitivities with each other, and further a weighted addition processing where a gain (weight) is adjusted is carried out to conduct a gravity center position control in the horizontal direction (x direction). Through these processings, relative positions of the respective colors set in the pixel number reduction image corresponding to the output image can be output as the same setting on the relative positions of the gravity center position of the respective colors in the original picked-up image.

To be specific, as illustrated in FIG. 9(b), the pixel number reduction image with a setting of arranging the gravity center positions where the respective colors of RGbGrB are evenly arranged is generated.

On the basis of Gb pixels on four corners of a 3×3 pixel block 321 illustrated in FIG. 9(a), a Gb pixel value having a gravity center position at a Gb pixel 331 illustrated in FIG. 9(b) is calculated.

On the basis of B pixels on four corners of a 3×3 pixel block 322 illustrated in FIG. 9(a), a B pixel value having a gravity center position at a B pixel 332 illustrated in FIG. 9(b) is calculated.

On the basis of Gb pixels on four corners of a 3×3 pixel block 323 illustrated in FIG. 9(a), a Gb pixel value having a gravity center position at a Gb pixel 333 illustrated in FIG. 9(b) is calculated.

On the basis of B pixels on four corners of a 3×3 pixel block 324 illustrated in FIG. 9(a), a B pixel value having a gravity center position at a B pixel 334 illustrated in FIG. 9(b) is calculated.

With regard to all the other RGbGrB pixels, a 3×3 pixel block is set in the pixel array of the image pickup element illustrated in FIG. 9(a), and on the basis of pixel values of the pixels having the same color on four corners in the block, a pixel value with a setting in which a gravity center is located at a position illustrated in FIG. 9(b) is calculated.

It should be noted that according to the related art example described above with reference to FIG. 1 to FIG. 4 and also the present embodiment too, the setting mode on the 3×3 pixel block illustrated in FIG. 9(a) is the same.

According to the related art example described with reference to FIG. 1 to FIG. 4, since all the pixels have the setting of the same sensitivity (same exposure time), a pixel gravity center of one pixel calculated from the pixel values of the pixels on the four corner in the 3×3 pixel block is set at the center of the 3×3 pixel block, which corresponds to positions of a pixel Gb 341 to a pixel B 344 illustrated in FIG. 9(b). This is the same as described above with reference to FIG. 3 and FIG. 4.

In contrast to this, according to the present embodiment, the gravity center position control for setting gravity center positions of the respective pixels after the reduction in the number of pixels at evenly arranged positions in the horizontal direction and also the vertical direction illustrated in FIG. 9(b) is carried out.

The control on the pixel gravity center is carried out through the following synthesis processings on plural pixels.

These synthesis processings are executed to control the gravity center position:

(a) a synthesis processing on pixels having different sensitivity differences for the gravity center position control in the vertical direction (y direction), and (b) a synthesis processing of setting a gain (weight) for the gravity center position control in the horizontal direction (x direction).

A specific control example on the position of the pixel gravity center according to the present embodiment will be described with reference to FIG. 10.

FIG. 10(A) illustrates
four patterns of 3×3 pixel blocks set in a pixel array of the image pickup element. These respective blocks are illustrated:

(a1) a pixel block 351 having Gb pixels on four corners,
(a2) a pixel block 352 having B pixels on four corners,
(a3) a pixel block 353 having R pixels on four corners, and
(a4) a pixel block 354 having Gr pixels on four corners.

Furthermore, these are illustrated in FIG. 10(B):

(b1) a position of a pixel gravity center 371 of the Gb pixels of the pixel number reduction image generated on the basis of the four Gb pixels in the pixel block 351, (b2) a position of a pixel gravity center 372 of the B pixels of the pixel number reduction image generated on the basis of the four B pixels in the pixel block 352, (b3) a position of a pixel gravity center 373 of the R pixels of the pixel number reduction image generated on the basis of the four R pixels in the pixel block 353, and (b4) a position of a pixel gravity center 374 of the Gr pixels of the pixel number reduction image generated on the basis of the four Gr pixels in the pixel block 354.

As illustrated in FIG. 10(B), set position modes for the pixel gravity center are different from each other in units of each color of the respective colors: Gb, B, R, and Gr as follows.

(b1) The pixel gravity center 371 of the Gb pixels of the pixel number reduction image generated on the basis of the four Gb pixels in the pixel block 351 is set as an upper left edge part of the center pixel of the pixel block 351.

(b2) The pixel gravity center 372 of the B pixels of the pixel number reduction image generated on the basis of the four B pixels in the pixel block 352 is set as a right edge part of the center pixel of the pixel block 352.

(b3) The pixel gravity center 373 of the R pixels of the pixel number reduction image generated on the basis of the four R pixels in the pixel block 353 is set as a lower left edge part of the center pixel of the pixel block 353.

(b4) The pixel gravity center 374 of the Gr pixels of the pixel number reduction image generated on the basis of the four Gr pixels in the pixel block 354 is set as a lower right edge part of the center pixel of the pixel block 354.

In any of these colors, the point of calculating the pixel value of one pixel set in the pixel number reduction image by utilizing the pixel values of the pixels having the same color on the four corners of the 3×3 pixel block is the same, but a different setting is made for each of these colors for the position of the pixel gravity center which is set on the basis of these four pixels.

In the image pickup apparatus according to the present embodiment, as illustrated in FIG. 10(B), the gravity center position control is carried out in a different mode for each of the respective colors. That is, the pixel value calculation utilizing the four pixel values of the 3×3 pixel block is executed as a different processing in units of each color.

It should be noted that the control for the gravity center position is basically carried out in a combination of the following two processings. The control is executed by these processings:

(a) a synthesis processing on pixels with different sensitivity differences for a shift of the gravity center position in the vertical direction (y direction), and (b) a synthesis processing in which a gain (weight) is set for a shift of the gravity center position in the horizontal direction (x direction).

Through these pixel syntheses, a configuration is established in which the arrangement of the respective colors for the constitutional pixels of the pixel number reduction image is an even arrangement illustrated in FIG. 9(b), that is, the gravity center positions of all the color are arranged at even intervals both in the horizontal direction and the vertical direction.

In a case where these evenly arranged pixels are integrated and output as the pixel number reduction image composed of the ¼ number of pixels for the picked-up image of the original image pickup element, and compression rates for distances between the respective pixels constituting the pixel number reduction image are all the same compression rate.

Figure 2:
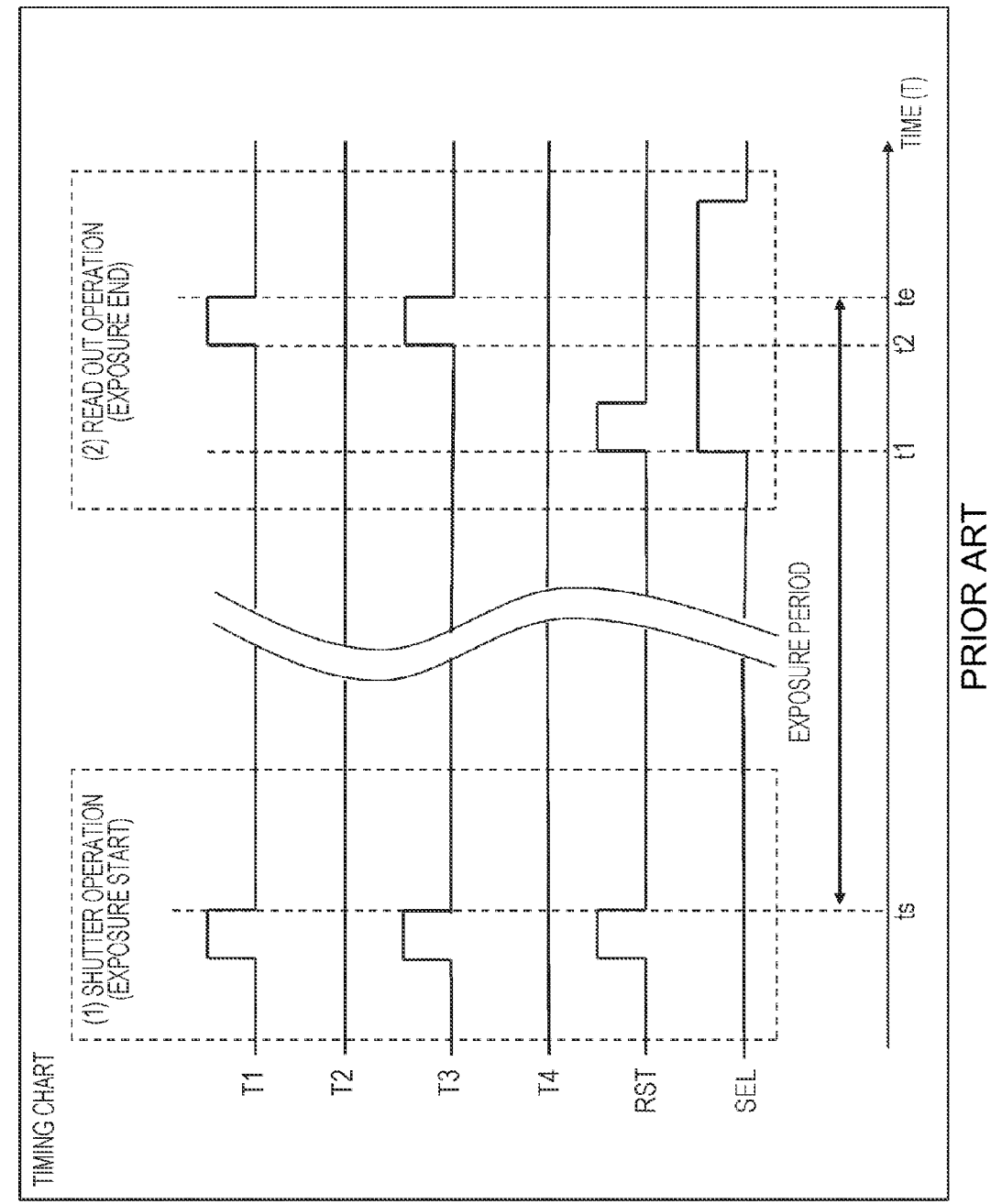
FIG. 2 is a timing chart in an image pickup processing by the image pickup element.
Figure 3:
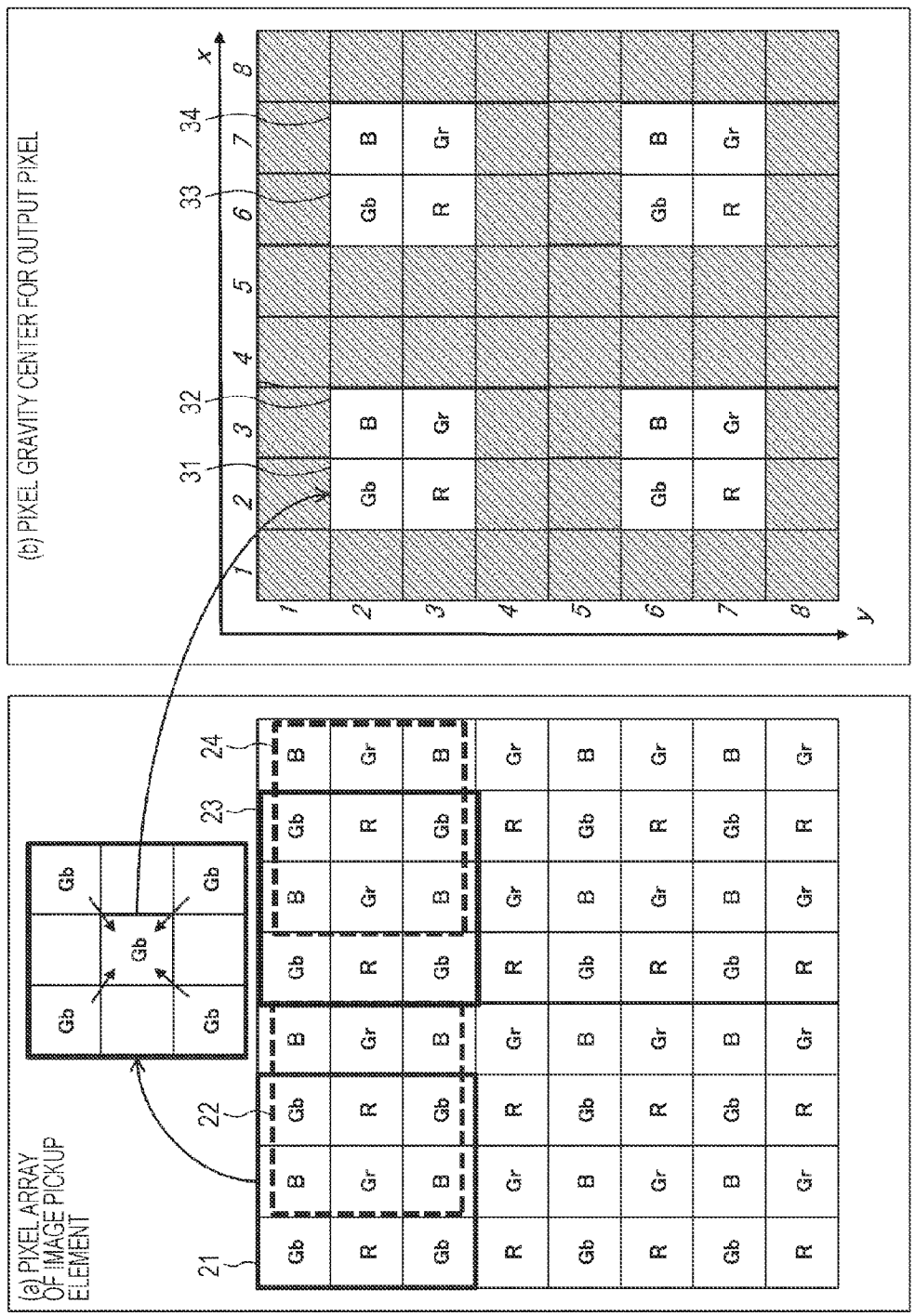
FIG. 3 is an explanatory diagram for describing a problematic point in a related art processing.
Figure 5:
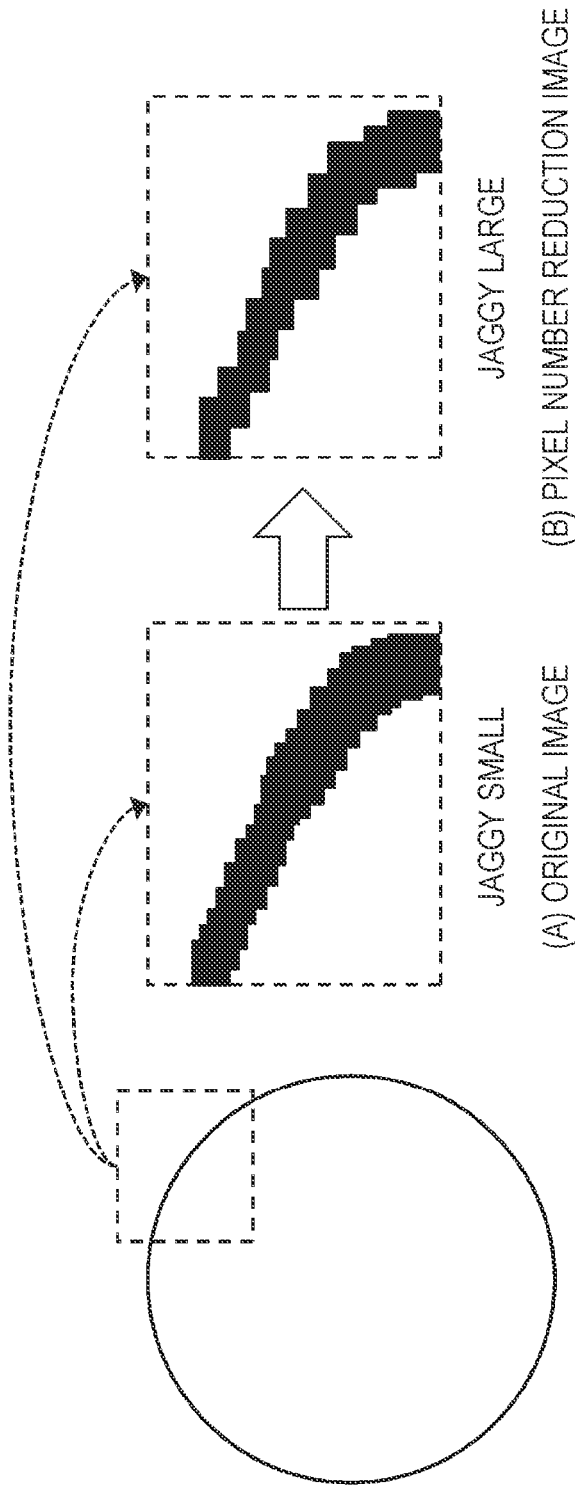
FIG. 5 is an explanatory diagram for describing a generation of jaggies as a problematic point in the related art processing.

As a result, it is possible to generate and output the image that does not cause the decrease in the image quality such as the expansion of jaggies or color blurring described above with reference to FIG. 5.

[4. Regarding Specific Configuration and Specific Processing Example of Image Pickup Element]

Next, a specific configuration and processing of the image pickup element that realizes the above-mentioned control processing on the gravity center position.

Figure 11:
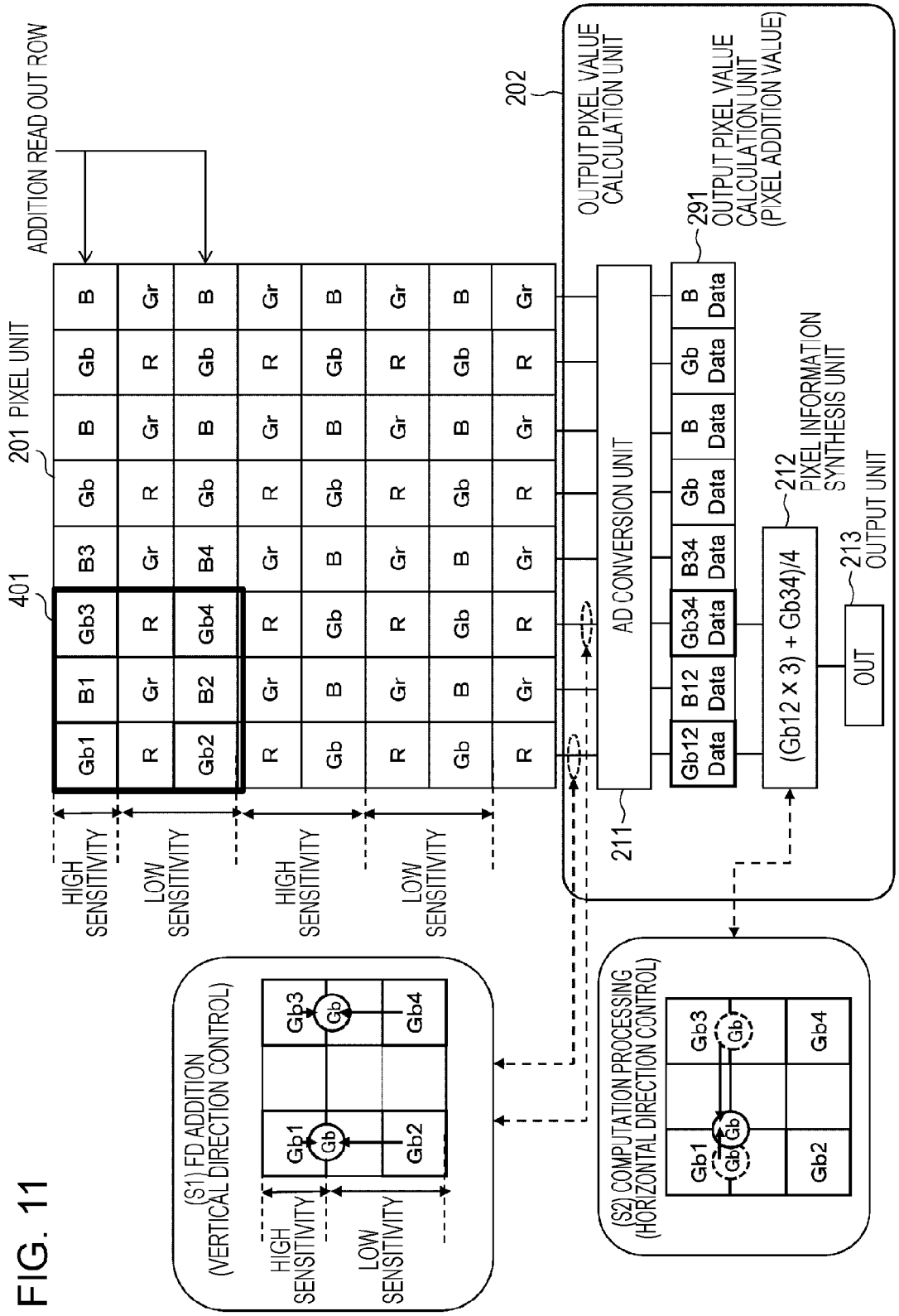
FIG. 11 is an explanatory diagram for describing a detailed configuration of the image pickup element and a processing.

FIG. 11 illustrates the respective constructional units of the image pickup element 102 illustrated in FIG. 7 as well as the specific processing example.

FIG. 11 illustrates the pixel unit 201 and the output pixel value calculation unit 202 similar to those in FIG. 7.

The pixel value calculation unit 202 has the AD conversion unit 211, the pixel information synthesis unit 212, and the output unit 213.

The pixel unit 201 has Bayer pattern of the RGbGrB pattern. This pixel unit 201 outputs a pixel value obtained by adding two pixels of a same color in the vertical direction (y direction) in every other row to each other.

A circuit for adding two pixels having a same color in the vertical direction (y direction) with to each other will be described with reference to FIG. 12. In the pixel unit, in accordance with a circuit configuration illustrated in FIG. 12(b), a pixel value obtained by adding the two pixels having the same color in the vertical direction (y direction) in every other row to each other is output.

The circuit illustrated in FIG. 12(b) is a circuit similar to that described above with reference to FIG. 1(b).

The circuit illustrated in FIG. 12(b) is a circuit corresponding to a pixel area 301 for four pixels of Gb1, R1, Gb2, and R2 illustrated in FIG. 12(a). The pixels of Gb and R are connected via transfer transistors (T1 to T4) to a gate part of a transistor for amplification (AMP) as illustrated in FIG. 12(b).

By using the circuit configuration illustrated in FIG. 12(b), an addition computation is carried out on pixels having a same color included in the pixel area 301 (according to the present example, Gb1 and Gb2).

In the read out processing for the pixel value, the selection (SEL) of the common pixel and the reset (RST) of the floating diffusion (FD) are carried out, the transistors T1 and T3 in the pixel Gb1 and the pixel Gb2 are simultaneously read out, and electrons generated in Gb1 and Gb2 are accumulated in the floating diffusion (FD) to be added to each other. Thus, an addition signal based on pixel values of the two pixels is obtained.

Through this addition processing, the addition signal based on the pixel values of the two pixels in the vertical direction is output from the pixel unit 201.

It should be noted however that according to the present embodiment, the pixels corresponding to the addition targets include (a) the high sensitivity pixel where the long time exposure is carried out, and (b) the low sensitivity pixel where the short time exposure is carried out, and the two pixels have these different sensitivities. According to the present embodiment, the pixel value addition processing at these two different sensitivities is executed.

In the pixel unit 201 of the image pickup element, the high sensitivity pixels and the low sensitivity pixels are set in units of two rows as illustrated in FIG. 12(a), and according to the present embodiment, among the pixels on the four corner of the 3×3 pixel block set as the basis unit for calculating the synthesis pixel value, the two pixels having the same color arranged in the vertical direction (y direction) certainly have a combination of these pixels having the different sensitivities:

(a) the high sensitivity pixel where the long time exposure is carried out, and (b) the low sensitivity pixel where the short time exposure is carried out.

As a result, the pixel addition is executed as this pixel addition processing of the different sensitivities.

A data example output from an output line illustrated below the pixel unit 201 of FIG. 11 is illustrated in step (S1) of FIG. 11.

Herein, as a representative example, a synthesis processing example on Gb pixels included in a 3×3 pixel block 401 illustrated in FIG. 11 is illustrated as step (S1) and step (S2).

Step (S1) illustrated in FIG. 11 is a synthesis processing on pixels having different sensitivity differences and corresponds to the control processing on the gravity center position in the vertical direction (y direction).

Step (S2) is a synthesis processing in which the gain (weight) is set and corresponds to the control processing on the gravity center position in the horizontal direction (x direction).

A sensitivity difference (exposure time ratio) between the high sensitivity and the low sensitivity is set as 3:1.

Figure 13:
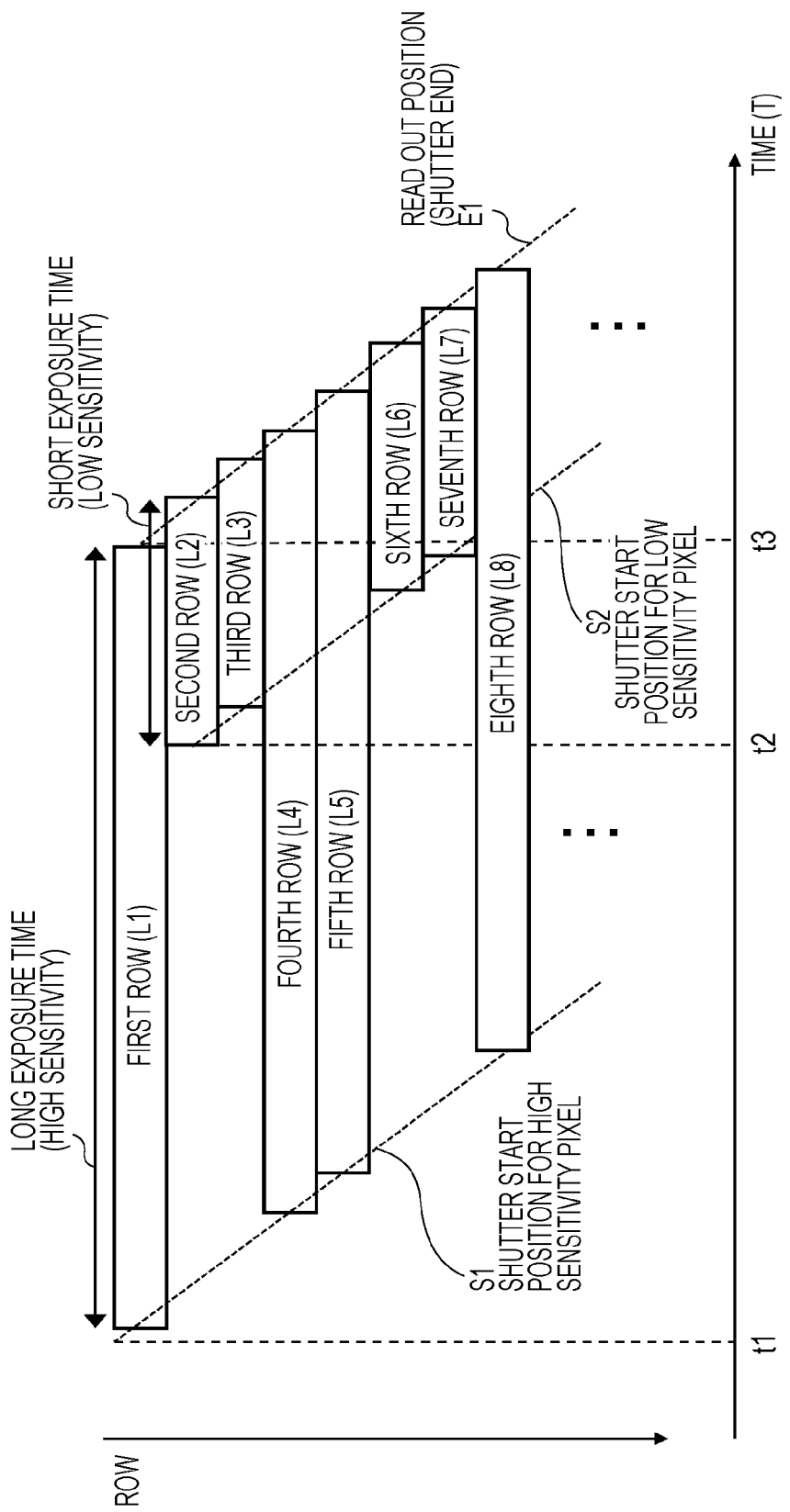
FIG. 13 is an explanatory diagram for describing an exposure control processing by the image pickup element.

FIG. 13 illustrates an exposure control processing example by the image pickup element 102.

The first row is the high sensitivity (long time exposure) pixel row.

The second and third rows are the low sensitivity (short time exposure) pixel rows.

The fourth and fifth rows are the high sensitivity (long time exposure) pixel rows.

The sixth and seventh rows are the low sensitivity (short time exposure) pixel rows.

Hereinafter, the high sensitivity and low sensitivity pixel rows are repeatedly set in units of two rows.

An exposure time control processing by the pixel unit 201 will be described with reference to FIG. 13.

With respect to the high sensitivity pixel, along a shutter start position S1 illustrated in FIG. 13, the exposure is sequentially started from the upper row towards the lower row.

On the other hand, with respect to the high sensitivity pixel, along a shutter start position S2 illustrated in FIG. 13, the exposure is sequentially started from the upper row towards the lower row.

In the read out processing, with respect to all the rows, the read out is sequentially executed along a read out position E1 on all the rows from the upper row to the lower row.

The control on this processing is executed, for example, on the basis of the control signal from the control unit 105.

As a result of this exposure control, the exposure processing in which the sensitivity difference (exposure time ratio) between the high sensitivity and the low sensitivity is set as 3:1 is executed.

In the 3×3 pixel block set in the pixel unit 201 composed of the two pixel rows with the different exposure times, the pixels having the same color on the upper edge row and the lower edge row are certainly a pair of the high sensitivity pixels and the low sensitivity pixels.

Therefore, the pixels corresponding to the addition targets of the two pixel addition circuit illustrated in FIG. 12(b) are a combination of the high sensitivity pixel and the low sensitivity pixel.

As a result, as illustrated in step (S1) of FIG. 11, the output from the pixel unit 201 illustrated in FIG. 11 is output as the pixel value at the position where the pixel gravity center approaches the high sensitivity pixel side.

A detail of the gravity center position control processing in this vertical direction (y direction) will be described with reference to FIG. 14.

Figure 14:
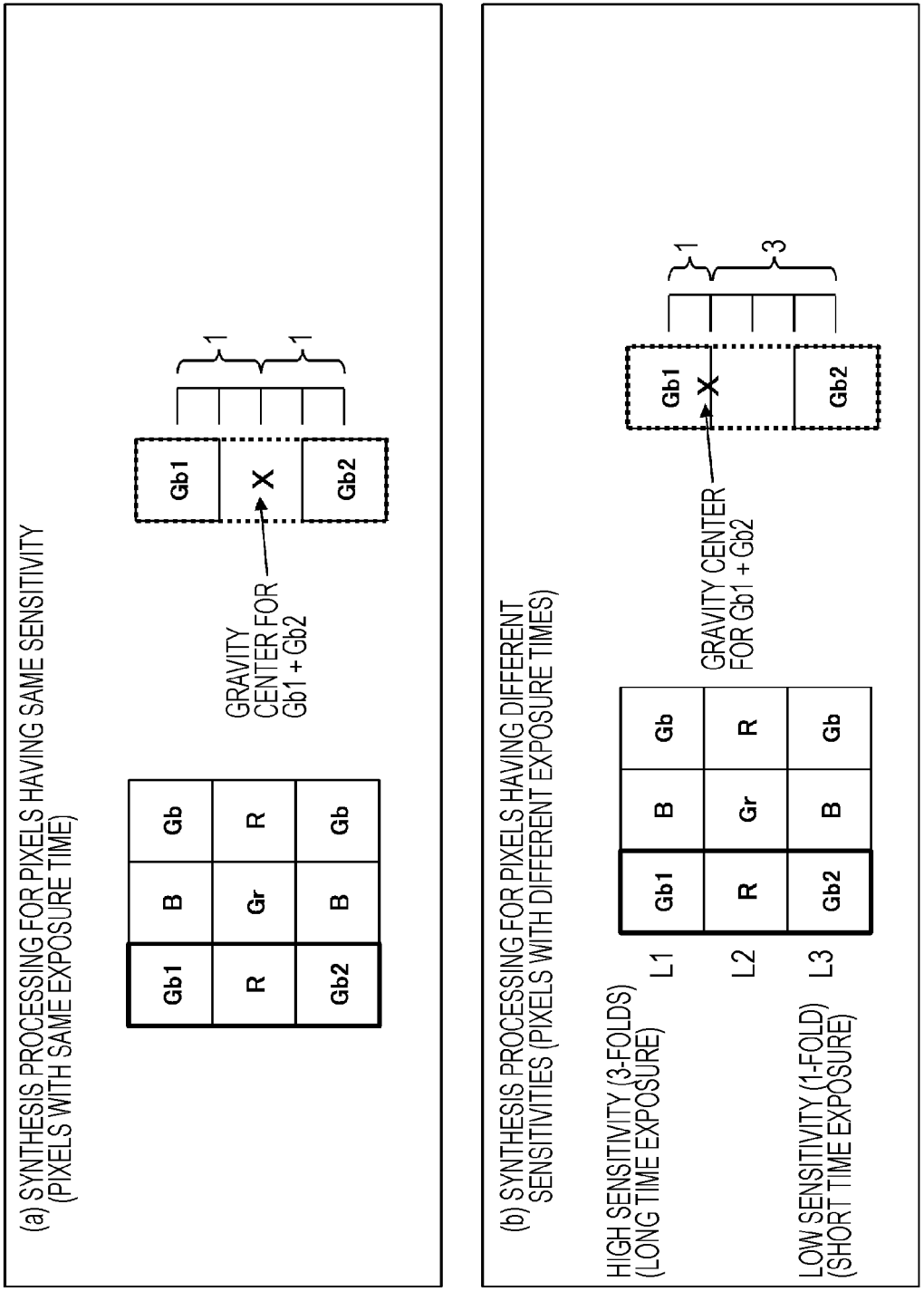
FIG. 14 is an explanatory diagram for describing a gravity center position control in a vertical direction based on a pixel value addition corresponding to a processing by the image pickup element.

FIG. 14 is an explanatory diagram for describing a gravity center position in the two pixel addition for the same color pixels in the vertical direction (y direction) and illustrates these two examples:

(a) a two pixel addition for the pixels having the same sensitivity, and (b) a two pixel addition for the pixels having the different sensitivities (sensitivity ratio 3:1).

FIG. 14(a) illustrates the gravity center position in the two pixel addition for the same color pixels in the vertical direction (y direction) in the case of the setting for the same sensitivity (same exposure time) in all the pixels described above with reference to FIG. 1 to FIG. 4.

In this case, the gravity center is set at a center position of the pixel positions for the two pixels corresponding to the addition targets (Gb1 and Gb2).

FIG. 14(b) corresponds to the image pickup apparatus according to the present embodiment and the case of the two pixel addition processing for the pixels having the different sensitivities (sensitivity ratio 3:1), and in this case, the gravity center position is set at a position close to the high sensitivity pixel (Gb1) side.

A ratio of a distance from the high sensitivity pixel (Gb1) to the gravity center to a distance from the low sensitivity pixel (Gb2) to the gravity center takes an inverse number of the sensitivity ratio and is 1:3.

That is, the gravity center is set at a position close to the pixel position of the high sensitivity pixel (Gb1).

In this manner, the pixel gravity center in the vertical direction is controlled.

This processing is represented by the processing in step (S1) of FIG. 11.

The output of the pixel unit 201 illustrated in FIG. 11 is output as a value on which the control in the vertical direction for the pixel gravity center is already carried out.

It should be noted that as described with reference to FIG. 10(B), the gravity center position control mode is varied for each of the respective colors.

As being understood from FIG. 10(B), the gravity center position in the vertical direction needs to be set on the upper side of the center pixel for the 3×3 pixel block with regard to Gb and B.

With regard to R and Gr, the gravity center position in the vertical direction needs to be set on the lower side of the center pixel for the 3×3 pixel block.

To realize this processing, the 3×3 pixel block for calculating Gb and B is a block where the high sensitivity pixel is set on the upper side like the pixel block 401 illustrated in FIG. 11. With this block setting, the gravity center is set while being shifted towards the upper side.

Figure 15:
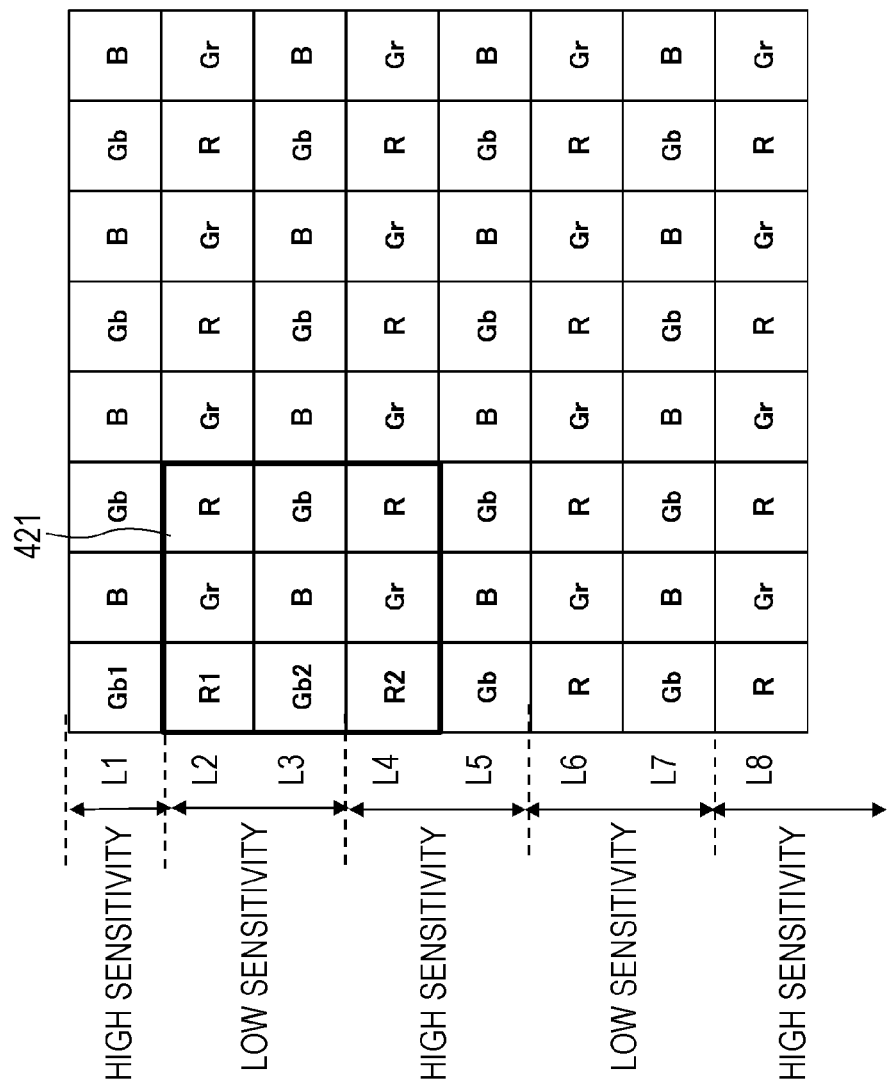
FIG. 15 is an explanatory diagram for describing a block which is set when the pixel number reduction image is generated.

On the other hand, the 3×3 pixel block for calculating R and Gr is a block where the high sensitivity pixel is set on the lower side like a pixel block 402 illustrated in FIG. 15. With this block setting, the gravity center is set while being shifted towards the lower side.

FIG. 16 illustrates a correspondence relationship between the blocks in accordance with the respective colors and the sensitivity settings, and the gravity center positions in the vertical direction.

(1) Processing example with respect to Gb and B (2) Processing example with respect to R and Gr These processing examples are illustrated.

As illustrated in FIG. 16 (1), in a case where Gb and B are calculated, the 3×3 pixel block for calculating Gb and B is a block where the high sensitivity pixel is set on the upper side. With this block setting, the gravity center is set while being shifted towards the upper side.

On the other hand, as illustrated in FIG. 16 (2), in a case where R and Gr are calculated, the 3×3 pixel block for calculating R and Gr is a block where the high sensitivity pixel is set on the lower side. With this block setting, the gravity center is set while being shifted towards the lower side.

The AD conversion unit 211 of the output pixel value calculation unit 202 illustrated in FIG. 11 executes the AD conversion on this addition value to generate a digital value.

This is the AD conversion unit output value (pixel addition value) 291 illustrated in FIG. 11.

This AD conversion unit output value (pixel addition value) 291 is input to the pixel information synthesis unit 212.

The pixel information synthesis unit 212 performs the control for the gravity center position in the horizontal direction (x direction), and this processing is realized through the synthesis processing in which the gain (weight) is set.

With regard to this processing, the processing on the Gb pixel of the 3×3 pixel block 401 illustrated in FIG. 11 will be described as an example.

The pixel information synthesis unit 212 utilizes two addition values, that is, these two Gb addition values:

[Gb12Data] corresponding to an addition value output of Gb1 and Gb2 in the 3×3 pixel block 401, and

[Gb34Data] corresponding to an addition value output of Gb3 and Gb4 in the 3×3 pixel block 401, and the final Gb pixel value set in the pixel number reduction image is calculated.

This pixel value calculation processing is carried out through the processing taking into account the pixel gravity center position, that is, the pixel value computation processing accompanied by the weighted addition in which the gain (weight) is set.

This processing is represented in step (S2) illustrated in FIG. 11.

As described above with reference to FIG. 10(b1), the gravity center position for the Gb pixels needs to be set at an upper left edge position of the center pixel of the 3×3 pixel block 351 illustrated in FIG. 10(b1).

For the processing for this purpose, the calculation on the pixel value (Gb(out)) of the Gb pixel of the pixel number reduction image is executed in accordance with the following expression (Expression 1).

$$Gb(\text{out}) = ((Gb12 \times 3) + Gb34)/4 \quad \text{(Expression 1)}$$

It should be noted that in the above-mentioned expression, Gb12 denotes a pixel addition value of Gb1 and Gb2, and Gb34 denotes a pixel addition value of Gb3 and Gb4.

Through the pixel value calculation in accordance with the above-mentioned expression (Expression 1), the gravity center position is set at the upper left edge of the center pixel of the 3×3 pixel block as illustrated in step (S2) of FIG. 11.

Figure 10:
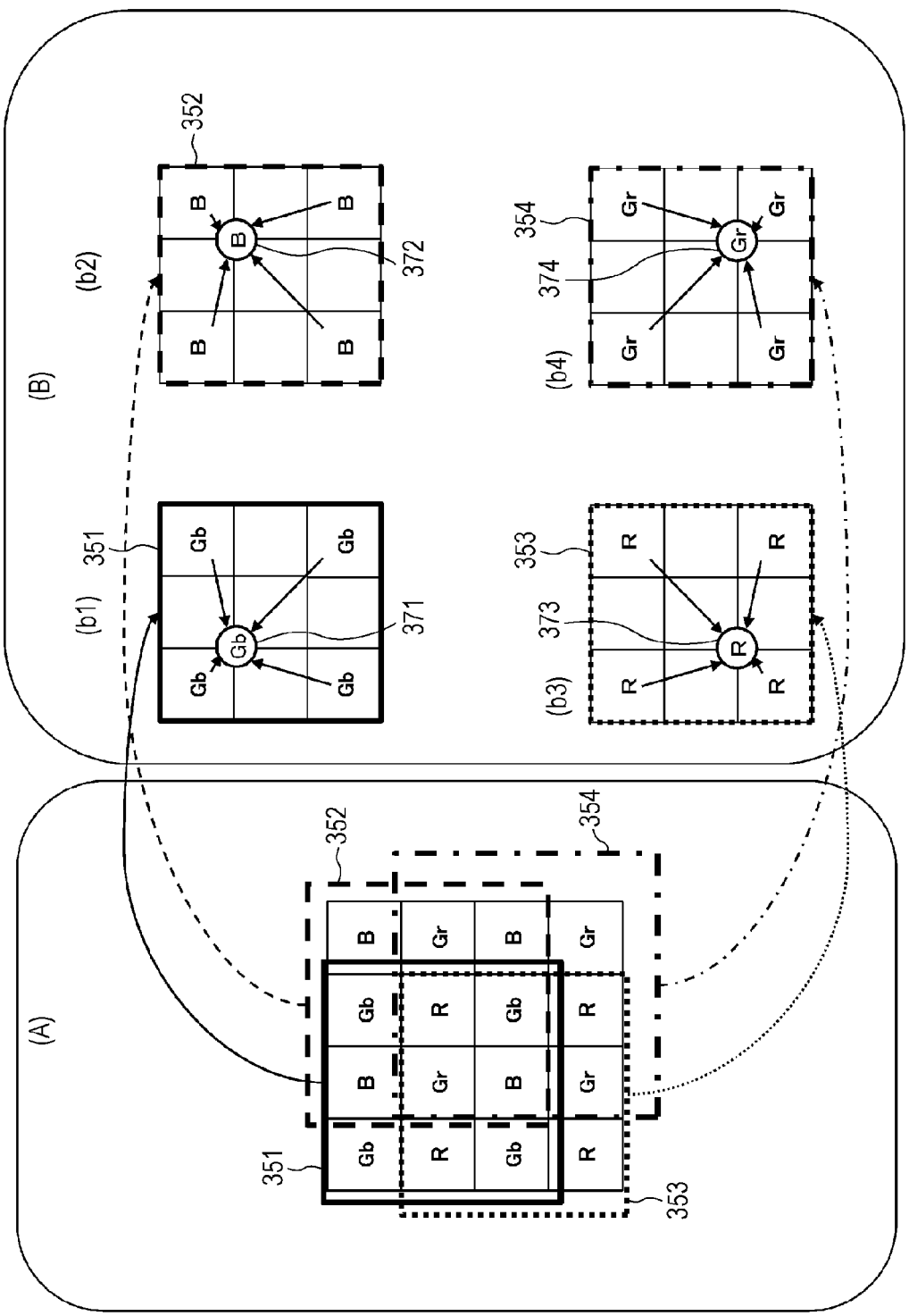
FIG. 10 is an explanatory diagram for describing the pixel number reduction image and the control on the pixel gravity center.

This result corresponds to the position of the pixel gravity center 371 for the position of the Gb pixels illustrated in FIG. 10(b1).

With regard to the Gb pixel, upon the computation of the two addition pixel values, a computation of multiplying the addition value on the left side (according to the present example, Gb12) by a larger gain (weight) than that for the addition value on the right side (Gb34) is executed so that the gravity center is shifted towards the left side from the center of the two addition pixel positions.

This gain (weight) setting mode varies for each of the respective colors.

As is apparent from the drawing illustrated in FIG. 10(B), with regard to the Gb pixel and the R pixel, a computation of multiplying the addition value on the left side by a larger gain (weight) than that for the addition value on the right side is executed so that the gravity center is shifted towards the left side from the center of the two addition pixel positions.

On the other hand, with regard to the B pixel and the Gr pixel, so that a computation of multiplying the addition value on the right side by a larger gain (weight) than that for the addition value on the left side is executed the gravity center is shifted towards the right side from the center of the two addition pixel positions.

Through the above-mentioned processing, the gravity center position control in the horizontal direction is carried out.

It should be noted that the gain ratio is 3:1 in the present example.

Figure 17:
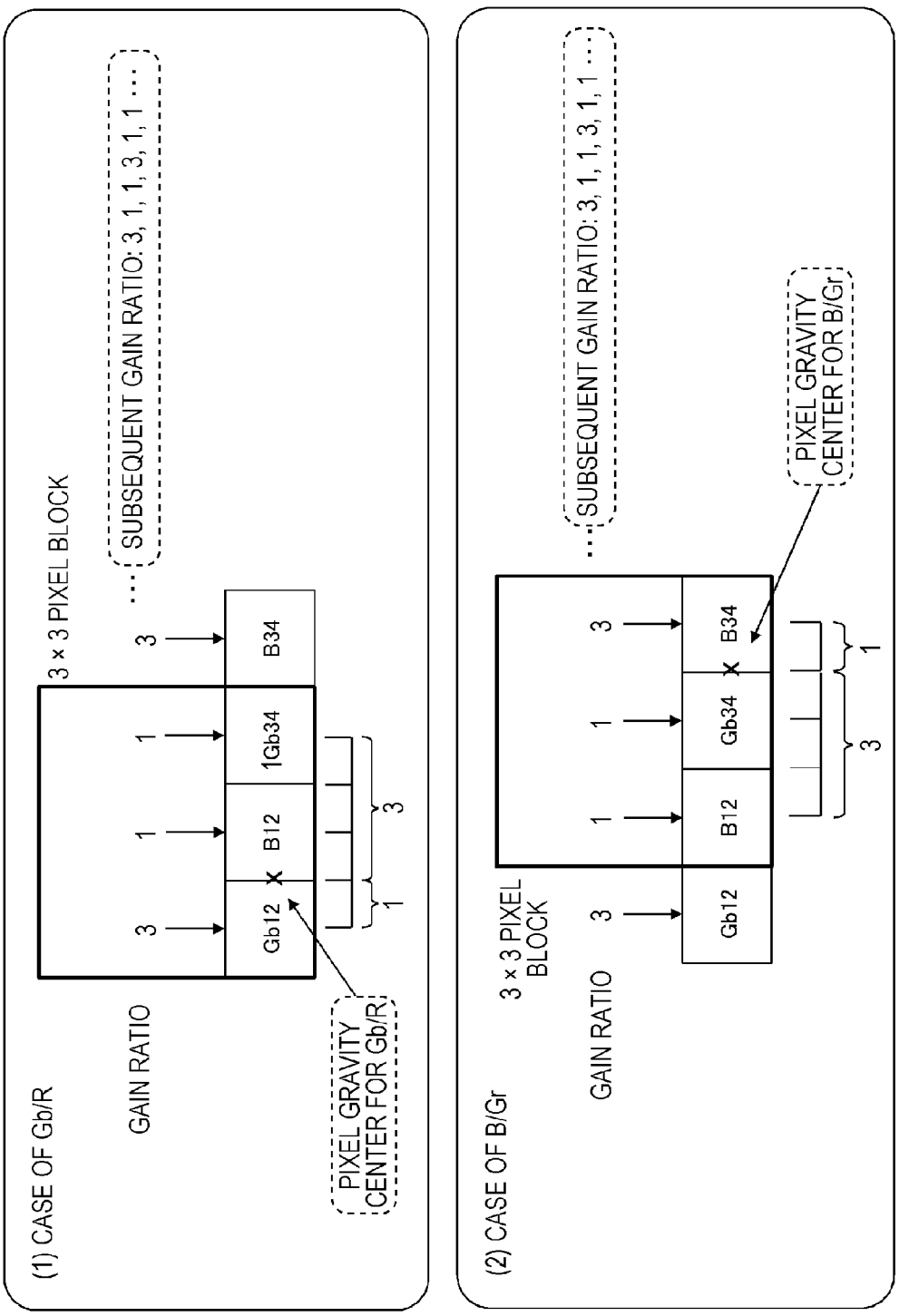
FIG. 17 is an explanatory diagram for describing a gravity center position control in a horizontal direction corresponding to a processing by the image pickup element.

FIG. 17 illustrates a correspondence relationship between the blocks in accordance with the respective colors and the sensitivity settings, and the gravity center positions in the horizontal direction.

(1) Processing example with respect to Gb and R
(2) Processing example with respect to B and Gr These processing examples are illustrated.

As illustrated in FIG. 17 (1), in a case where Gb and R are calculated, among the two addition values obtained from the 3×3 pixel block for calculating Gb and R, the gain is set as 3 for the addition value on the left side, and the gain is set as 1 for the addition value on the right side, so that through the weighted addition processing based on this gain setting, the gravity center can be set while being shifted towards the left side.

On the other hand, as illustrated in FIG. 17 (2), in a case where B and Gr are calculated, among the two addition values obtained from the 3×3 pixel block for calculating B and Gr, the gain is set as 1 for the addition value on the left side, and the gain is set as 3 for the addition value on the right side, so that through the weighted addition processing based on this gain setting, the gravity center can be set while being shifted towards the right side.

In the pixel information synthesis unit 212 illustrated in FIG. 11, by executing the pixel value calculation processing accompanied by the above-mentioned gravity center position control in the horizontal direction, one output pixel value is decided on the basis of the two addition values.

This result is output to the signal processing unit via the output unit 213.

As described above with reference to FIG. 9(b), the pixel gravity centers for the respective constitutional pixels of the pixel number reduction image generated by the gravity center position control have a setting in which the respective pixel positions are evenly arranged, and the pixel number reduction image having the relative pixel position similar to the pixel arrangement of the picked-up image of the original image pickup element is obtained.

As a result, the high quality image in which the generation of jaggies or the like described above with reference to FIG. 5 is suppressed is output.

It should be noted that according to the above-mentioned embodiment, the configuration has been described in which the 3×3 pixel block is set as the unit and the sensitivity difference in units of two rows is set as 3:1, but other various settings can be made for the block size, the sensitivity ratio, and the like. If the gain setting and the like are adjusted in accordance with the respective settings to carry out the processing, it is possible to conduct the control for setting the gravity center position in various positions.

In the above, the present invention has been described in detail with reference to the particular embodiments. However, it is apparent that those skilled in the art may make various modifications and alterations of the embodiments within a scope without departing from the gist of the present invention. That is, the present invention has been disclosed by way of exemplification and should be not construed in a limited manner. To determine the gist of the present invention, the section of claims should be considered.

Also, the series of processings described in the specification can be executed by hardware or software, or a composite configuration of those. In a case where the series of processings is executed by the software, a program recording a processing sequence can be installed into a memory in a computer which is incorporated in dedicated-use hardware for the execution, or the program can be installed into a general-use computer that can execute various processings for the execution. For example, the program can be previously recorded in a recording medium. In addition to the installment from the recording medium into the computer, the program can be received via a network such as LAN (Local Area Network) or the internet and installed into the recording medium such as a built-in hard disc.

It should be noted that the various processings described in the specification may be executed not only in a time-series manner in accordance with the description but also executed in parallel or individually in accordance with a processing performance of the apparatus that executes the processing or as appropriate. Also, the system in the present specification refers to a logical aggregate structure of plural apparatuses and is not limited to a system in which the apparatuses of the respective configurations are located in a same casing.

INDUSTRIAL APPLICABILITY

As described above, according to the embodiment of the present invention, the apparatus and method for realizing the processing with which it is possible to conduct the control on the pixel gravity center when the pixel number reduction image is generated in the image pickup apparatus are realized.

To be specific, a pixel unit configured to output a pixel addition signal obtained by adding output pixel signals from pixels having different sensitivities to each other and a pixel information synthesis unit configured to execute a weighted addition processing of multiplying plural pixel addition signals output from the pixel unit by a previously set gain and calculate a configuration pixel value of a pixel number reduction image where a total number of pixels is lower than a number of pixels of the pixel unit are provided. A control on gravity center positions for respective pixels constituting the pixel number reduction image is executed through the pixel addition signal generation processing by the pixel unit and the weighted addition processing by the pixel information synthesis unit. For example, a gravity center position control is executed so as to evenly arrange the gravity center positions for the respective pixels constituting the pixel number reduction image in the pixel unit.

Through this processing, it is possible to generate a high quality image in which a generation of jaggies or the like is suppressed.

REFERENCE SIGNS LIST

11 PIXEL REGION
21 to 24 BLOCK 31 to 34 PIXEL
101 OPTICAL LENS
102 IMAGE PICKUP ELEMENT
103 SIGNAL PROCESSING UNIT
105 CONTROL UNIT
120 OUTPUT IMAGE
201 PIXEL UNIT
202 OUTPUT PIXEL VALUE CALCULATION UNIT
211 AD CONVERSION UNIT
212 PIXEL INFORMATION SYNTHESIS UNIT
213 OUTPUT UNIT
250 ADDITION PIXEL VALUE
291 AD CONVERSION UNIT OUTPUT VALUE (PIXEL ADDITION VALUE)
321 to 324 BLOCK
331 to 334 PIXEL
351 to 354 BLOCK
371 to 374 PIXEL GRAVITY CENTER
401 BLOCK
421 BLOCK

The invention claimed is:

1. An image pickup apparatus comprising:
a pixel unit configured to output a pixel addition signal obtained by adding output pixel signals from pixels having different sensitivities to each other; and
a pixel information synthesis unit configured to execute a weighted addition processing of multiplying plural pixel addition signals output from the pixel unit by a previously set gain and calculate a configuration pixel value of a pixel number reduction image where a total number of pixels is lower than a number of pixels of the pixel unit,
wherein a control on gravity center positions for respective pixels constituting the pixel number reduction image is executed through the pixel addition signal generation processing by the pixel unit and the weighted addition processing by the pixel information synthesis unit.

2. The image pickup apparatus according to claim 1,
wherein the pixel unit and the pixel information synthesis unit execute a gravity center position control to evenly arrange the gravity center positions for the respective pixels constituting the pixel number reduction image in the pixel unit.

3. The image pickup apparatus according to claim 1,
wherein the pixel unit executes a gravity center position control in one direction of the respective pixels constituting the pixel number reduction image in the pixel addition signal generation processing, and
wherein the pixel information synthesis unit executes, in the weighted addition processing, the gravity center position control in a direction orthogonal to the gravity center position control direction executed by the pixel unit.

4. The image pickup apparatus according to claim 1,
wherein the pixel unit performs a calculation for an addition pixel value as a result of the gravity center position control in accordance with a sensitivity ratio of pixels corresponding to addition processing targets in the pixel addition signal generation processing.

5. The image pickup apparatus according to claim 1,
wherein the pixel information synthesis unit executes a weighted addition processing of multiplying plural pixel addition signals corresponding to weighted addition processing targets by a gain in accordance with a gravity center position of a planned control in the weighted addition processing.

6. The image pickup apparatus according to claim 1,
wherein the pixel unit has a pixel array in which pixels of a same color are arranged in every other row and pixels set to have a different sensitivity of a sensitivity ratio 1:3 are arranged every two other rows, and
wherein the pixel unit has a configuration of outputting a pixel addition signal obtained by adding output pixel signals from pixels having two different sensitivities where the sensitivity ratio is 1:3 to each other.

7. The image pickup apparatus according to claim 1,
wherein the pixel unit has a pixel array in which pixels of a same color are arranged in every other column, and
wherein the pixel information synthesis unit executes a weighted addition processing of multiplying two pixel addition signals output from the pixel unit in every other column by a gain of 1:3 and calculates the configuration pixel value of the pixel number reduction image where the total number of pixels is lower than the number of pixels of the pixel unit.

8. The image pickup apparatus according to claim 1, further comprising:
a control unit configured to execute an exposure time control for units of a region of the pixel unit.

9. An image pickup apparatus control method executed in an image pickup apparatus, the control method comprising:
a pixel addition signal output step of outputting, in a pixel unit, a pixel addition signal obtained by adding output pixel signals from pixels having different sensitivities to each other; and
a pixel information synthesis step of executing, in a pixel information synthesis unit, a weighted addition processing of multiplying plural pixel addition signals output from the pixel unit by a previously set gain and calculating a configuration pixel value of a pixel number reduction image where a total number of pixels is lower than a number of pixels of the pixel unit,
wherein a control on gravity center positions for respective pixels constituting the pixel number reduction image is executed through the pixel addition signal generation processing by the pixel unit and the weighted addition processing by the pixel information synthesis unit.

* * * * *